United States Patent
Gittins

(10) Patent No.: US 10,223,306 B2
(45) Date of Patent: Mar. 5, 2019

(54) PROGRAMMABLE MEMORY TRANSFER REQUEST PROCESSING UNITS

(71) Applicant: Benjamin Aaron Gittins, Nadur (MT)

(72) Inventor: Benjamin Aaron Gittins, Nadur (MT)

( * ) Notice: Subject to any disclaimer, the term of this patent is extended or adjusted under 35 U.S.C. 154(b) by 0 days.

(21) Appl. No.: 15/564,200

(22) PCT Filed: Apr. 7, 2016

(86) PCT No.: PCT/IB2016/051969
§ 371 (c)(1),
(2) Date: Oct. 4, 2017

(87) PCT Pub. No.: WO2016/162817
PCT Pub. Date: Oct. 13, 2016

(65) Prior Publication Data
US 2018/0129620 A1 May 10, 2018

(30) Foreign Application Priority Data
Apr. 7, 2015 (AU) .................. 2015901247

(51) Int. Cl.
*G06F 13/28* (2006.01)
*G06F 13/16* (2006.01)
(Continued)

(52) U.S. Cl.
CPC .......... *G06F 13/28* (2013.01); *G06F 12/0897* (2013.01); *G06F 12/1027* (2013.01); *G06F 12/1045* (2013.01); *G06F 12/1081* (2013.01); *G06F 12/1491* (2013.01); *G06F 13/16* (2013.01); *G06F 13/1673* (2013.01); *G06F 2212/1016* (2013.01); *G06F 2212/1024* (2013.01); *G06F 2212/1052* (2013.01); *G06F 2212/681* (2013.01)

(58) Field of Classification Search
CPC ...... G06F 13/28; G06F 13/16; G06F 13/1673; G06F 12/0897; G06F 12/1027; G06F 12/1045; G06F 12/1081; G06F 12/1491; G06F 2212/1016; G06F 2212/1024; G06F 2212/1052; G06F 2212/681
See application file for complete search history.

(56) References Cited

U.S. PATENT DOCUMENTS

2002/0069339 A1* 6/2002 Lasserre ................. G06F 1/206
711/201
2003/0097394 A1* 5/2003 Chauvel ................ G06F 9/5016
718/100
(Continued)

*Primary Examiner* — Ramon A. Mercado

(57) ABSTRACT

An apparatus (100) comprising a programmable memory transfer request processing (PMTRP) unit (120) and a programmable direct memory access (PDMA) unit (140). The PMTRP unit (120) comprises at least one programmable region descriptor (123). The PDMA unit (140) comprises at least one programmable memory-to-memory transfer control descriptor (148, 149, 150). The PDMA unit (140) is adapted to send (143) a memory transfer request to the PMTRP unit (120). The PMTRP unit (120) is adapted to receive (134) and successfully process a memory transfer request issued by the PDMA unit (120) that is addressed to a memory location that is associated with a portion of at least one of the at least one region descriptor (123) of the PMTRP unit (120).

20 Claims, 22 Drawing Sheets

(51) Int. Cl.
   *G06F 12/1027* (2016.01)
   *G06F 12/1081* (2016.01)
   *G06F 12/14* (2006.01)
   *G06F 12/0897* (2016.01)
   *G06F 12/1045* (2016.01)

(56) References Cited

U.S. PATENT DOCUMENTS

| | | | | |
|---|---|---|---|---|
| 2011/0153877 | A1* | 6/2011 | King | G06F 13/28 |
| | | | | 710/26 |
| 2012/0117301 | A1* | 5/2012 | Wingard | G06F 12/1027 |
| | | | | 711/6 |
| 2014/0359219 | A1* | 12/2014 | Evans | G06F 12/0802 |
| | | | | 711/118 |
| 2018/0129620 | A1* | 5/2018 | Gittins | G06F 12/0897 |

* cited by examiner

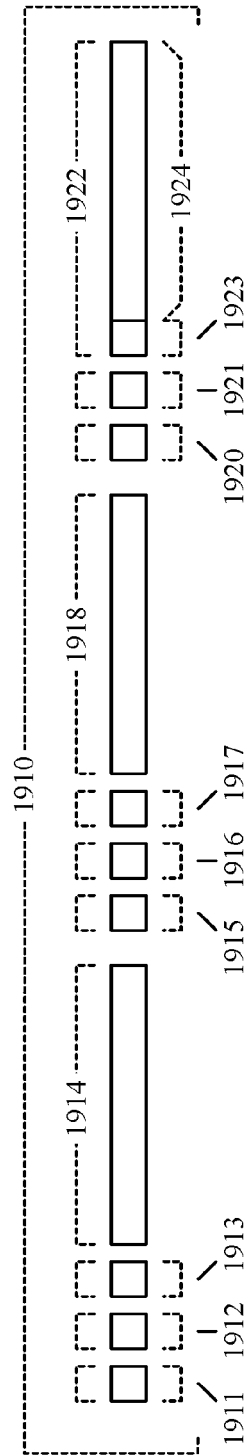
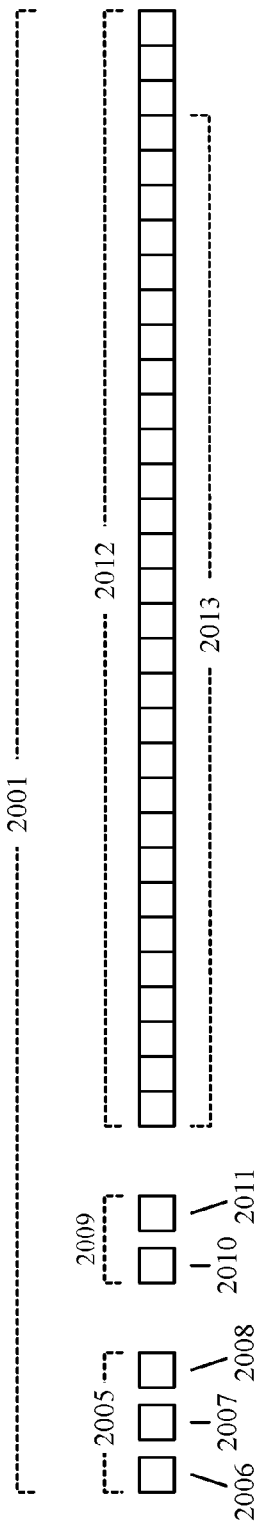
FIGURE 19
FIGURE 20

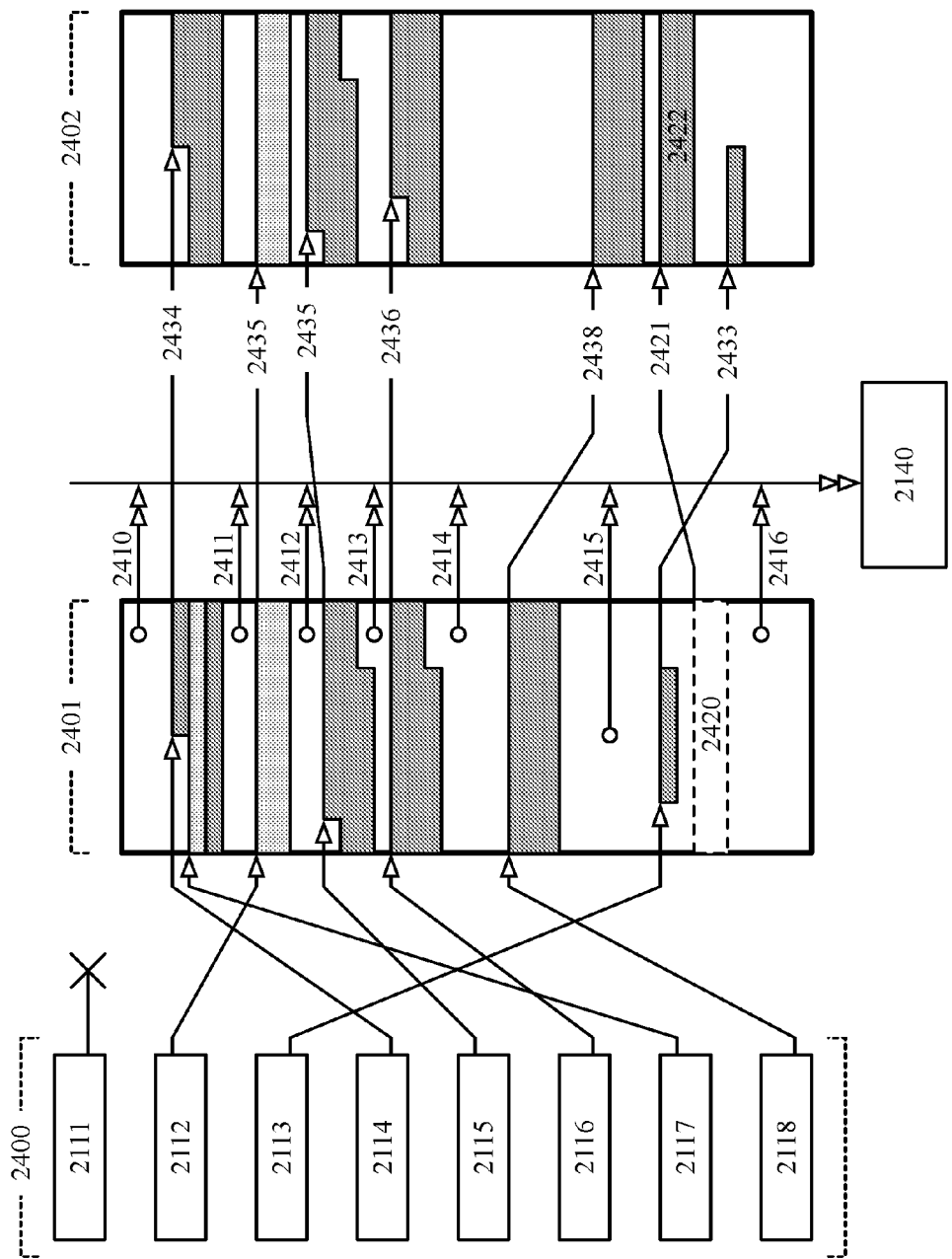

PROGRAMMABLE MEMORY TRANSFER REQUEST PROCESSING UNITS

FIELD OF THE INVENTION

The invention relates, but is not limited, to the implementation and use of so called memory protection units, memory management units, instruction caches, data caches, and caches in the form of translation lookaside buffers that are used in memory management units. Various embodiments of the present invention are suitable for use in many 32-bit and 64-bit processor environments. This includes, but is not limited, to real-time, safety and security critical, cyber-physical computing environments as well as highly resource constrained computing environments.

BACKGROUND OF THE INVENTION

A reference in this specification to a published document is not to be taken as an admission that the contents of that document are part of the common general knowledge of the skilled addressee of the present specification. Examples of memory management architectures are disclosed in [1], [2], and [3]. The technical terms employed to describe the architecture of various memory protection unit (MPU) and memory management unit (MMU) technologies sometimes have conflicting definitions. Throughout this specification, including the claims:

'Comprises' and 'comprising' are used to specify the presence of stated features, integers, steps or components but do not preclude the presence or addition of one or more other features, integers, steps, components.

A memory store (e.g. 118 of FIG. 1) coupled with a memory controller (e.g. 115 of FIG. 1) may be described at a higher level of abstraction as a memory store.

A peripheral may (e.g. network controller 105 of FIG. 1) or may not (e.g. cryptographic accelerator module) have external I/O pins. A peripheral comprises at least one interconnect interface, in which each interconnect interface is either an interconnect-master or interconnect-target port.

A bus is a type of interconnect. A crossbar is a type of interconnect.

A memory-to-memory direct memory access (M2M DMA) unit (e.g. 140 of FIG. 1) is a programmable hardware circuit specifically optimised for issuing memory transfer requests over one or more interconnect-master ports (e.g. 143 and 144 of FIG. 1) for the purpose of reading the value of memory stored in one memory location and writing that value to a different memory location. A M2M DMA is a slave device subject to control by a different master device (e.g. 110 or 194 of FIG. 1). A well known example of this type of M2M DMA unit is the Intel 8237A. A M2M DMA unit may also offer additional memory movement related capabilities, such as reading contiguous memory locations from a memory store and writing each word of data to the same address of a memory mapped peripheral. A M2M DMA unit can be described as a programmable direct memory access (PDMA) unit.

A memory protection unit (MPU) receives a memory transfer request associated with an input address space and in response generates a memory transfer requests associated with an output address space. An MPU is characterised in that (a) access controls may be applied to one or more regions of the input address space; and (b) the MPU always employs an identity transformation between the address of a memory transfer request in the input address space and the address of the corresponding memory transfer request in the output address space. Some MPU architectures are explicitly designed to support the mapping of two or more region descriptors to the same contiguous region of the input address space at run-time.

A memory management unit (MMU) receives a memory transfer request associated with an input address space and in response generates a corresponding memory transfer request associated with an output address space. An MMU is characterised in that (a) access controls may be applied to one or more regions of the input address space, and (b) the MMU is adapted to translate the address of a memory transfer request associated with the input address space and the address of the corresponding memory transfer request in the output address space.

A well-formed memory transfer request is any memory transfer request that correctly satisfies the associated interconnect protocol requirements for a memory transfer request. The reception of a well-formed memory transfer request implies that that the request was not malformed on issue and that the request was not corrupted in transit.

In many publications describing memory management technologies, a "virtual address space" is mapped to a "physical address space". This terminology is unambiguous when there is a single level of address translation means for software running on a general purpose processor that is employed in a given computer architecture. In this specification we use the terminology an "input address space" is mapped to a "translated address space". This later terminology can be used consistently for each level of memory address translation means when considering computer architectures that have two or more levels of address translation means. This later terminology can also be used consistently for memory address translation means that are adapted to receive memory transfer requests from general purpose processors, graphics processors and other types of interconnect-master peripherals.

Throughout this specification, including the claims, we define a page, page descriptor, frame, segment, segment descriptor and range descriptor as follows:

A "frame" of N bytes in length defines a contiguous region of memory in a translated address space that is N bytes in length and that starts on an N byte boundary.

A "page" of N bytes in length defines a contiguous region of memory in an input address space that is N bytes in length and that starts on an N byte boundary. A "page descriptor" describes a page of memory associated with an input address space. A page of memory in an input address space may be mapped to a frame of memory in a translated address space.

A "segment" of N bytes in length defines a contiguous region of memory in an input address space that is N bytes in length that starts on an O byte boundary. The allocated portion of a segment may be less than N bytes in length and may also start at an address offset located within that segment. The terminology "a variable length segment" implies that the length of the allocated portion of a segment may vary. The allocated portion of a segment may be mapped to a contiguous region of memory on a P byte boundary in a translated address space. The value of O and the value of P may also be different. The relationship between the values of N, O and P vary depending on the segmentation scheme implementation details. In practice, some computer architectures are designed to employ means implemented in hardware to prevent the allocated portions of two programmable segments overlapping in the input address space. Correct operation of other computer architectures may require the executive software to ensure that the allocated portions of two programmable segments do not overlap in the input address space at run-time. A "segment descriptor" describes a segment of memory associated with an input address space.

A "range descriptor" of N bytes in length defines a contiguous region of memory in the input address space that is N bytes in length. A range may be defined by a lower-bound address and an upper-bound address, or a lower-bound address and a range length. If there is no programmable address translation enabled in a given range descriptor, a range in the input address spaced is mapped using the identity transformation to a contiguous region of memory in the output address space. A range descriptor may start and stop on fine grain boundaries (e.g. 64-byte granularity) in the input address space. Alternatively, a range descriptor may start and stop on coarse grain boundaries in the input address space (e.g. kibibyte granularity). It is common with commercial off the shelf MPU implementations to explicitly permit two or more range descriptors, in which those range descriptors do not have programmable address translation capabilities, to be associated with overlapping memory regions in the input address space.

Throughout this specification, including the claims we define a cache line, cache block, cache sub-block and a cache tag as follows:

A "cache line" is a contiguous region of memory. Traditionally in general purpose computer architectures, the length of a cache line ranges from 8-bytes to 32-bytes. In principle, a cache line could have the same length as the maximum length of a page or a segment. Each cache line is associated with a cache tag. In the context of cache lines, a "cache tag" stores metadata about a cache line. That metadata may include, but may not be limited to, its address in the input address space, its address in the translated address space and the status of that cache line.

A "cache block" is a contiguous region of memory subdivided into cache sub-blocks. Traditionally in general purpose computer architectures a cache block is comprised of 2 to 4 cache sub-blocks. Traditionally in general purpose computer architectures, the length of a cache sub-block ranges between 8-bytes to 32-bytes. Each cache block is associated with a cache tag. In the context of cache blocks, a cache tag stores metadata about a cache block. That metadata may include, but may not be limited to, its address in the input address space, its address in the translated address space and the status of the cache sub-blocks.

Throughout this specification, including the claims, we define a "programmable memory transfer request processing" (PMTRP) unit and a "region descriptor" as follows:

A PMTRP unit is adapted to receive and process memory transfer requests according to various policies, in which each memory transfer request is associated with a specific address space, and each address space is associated with certain policies to be enforced by that PMTRP unit. A "region descriptor" is used to associate various policies with a specific region of a specific address space associated with a specific PMTRP unit instance. For example:

a region descriptor may or may not be adapted with one or more access control fields;

a region descriptor may or may not be adapted with one or more address translation fields; and a region descriptor may or may not be adapted with fields that modify the default behavior of the memory subsystem that receives memory transfer requests issued by the PMTRP unit (e.g. by adjusting the cache write policy and/or memory order policy).

The region of an address space associated with a region descriptor:

may or may not be constrained with regards to a specific subset of all possible base address offsets within an address space; and may or may not be constrained with regards to a specific subset of all possible region lengths.

Consequently, the fields of a "region descriptor" can be adapted to implement a variety of descriptors. This includes, but is not limited to: page descriptors; segment descriptors; translation look aside buffer descriptors; range descriptors without programmatic address translation; range descriptors with programmatic address translation; and cache tags.

Clearly, the specific fields of a given region descriptor are defined specifically for that region descriptor instance.

A PMTRP unit is defined independently from the one or more interconnect-masters that are adapted to issue memory transfer requests to the one or more interconnect-target ports of that PMTRP unit. By way of non-limiting example, a PMTRP unit that implements MMU functionality may be adapted for use as a private IOMMU for one interconnect-master peripheral without loss of generality. Furthermore, a PMTRP unit that implements MMU functionality may be adapted for use a shared IOMMU that is shared across multiple interconnect-master peripherals without loss of generality.

Throughout this specification, including the claims we define a "programmable region descriptor" as a region descriptor in which one or more fields of that region descriptor may be adjusted programmatically.

Early MMU schemes for managing the main memory of computer architectures were typically adapted for use with main memories that had small storage capacities.

As the storage capacity of physical memory increased, MMU schemes based on different principles were employed to overcome various perceived or actual limitations [1], [2] of those earlier MMU schemes that were designed for small storage capacities.

To the best of the author's knowledge, all published MMU schemes that support large input address spaces with fine grain memory allocation capabilities employ (either software or hardware controlled) translation look aside buffers (TLB). Those TLB are used to cache a relatively small number of the potentially very large number of region descriptors that can be associated with an input address space. Consider the VAX-11/780 architecture [3]. The VAX-11/780 MMU scheme requires 8,388,608 region descriptors to allocate the entire 32-bit input address space [2]. Some implementations of the VAX-11/780 employed a unified TLB to cache up to 128 of those up to 8,388,608 region descriptors [2]) in high-speed memory, and stored the enabled region descriptors in one or more tables that were stored in relatively slower main-memory storage. Subsequently, to the best of the author's knowledge, industry practice has predominantly focused on employing two (or more) levels of indirection (indexed schemes, hash schemes, linked-list schemes) when searching for region descriptors to improve the management of a potentially very large number of enabled region descriptors. The industry trend towards the use of two or more levels of indirection is apparently to overcome various technical difficulties found in the single-level translation architectures such as the VAX-11/780 architecture [2]. To the best of the author's knowledge, all published implementations of MMU schemes which support two or more levels of indirection to access a leaf region-descriptor in a 32-bit or 64-bit address space employ a (software or hardware controlled) TLB to accelerate their performance. It is well known that the use of a TLB to cache region descriptors in combination with a data cache significantly increases the complexity of performing static timing analysis of software running on a processor core that has a data cache that is enabled and that has a TLB capability that is enabled.

There is a long-felt need for an MMU architecture that has low-latency, high-throughput, constant time operation with support for relatively fine-grain memory allocation in 32-bit and 64-bit input address spaces. In the microcontroller market, there is also a need to provide a PMTRP unit that can operate as a memory protection unit (MPU) and also operate as a MMU to run commercial high-assurance security-critical real-time operating systems (RTOS). This is because many high-assurance RTOS rely on the availability of a hardware MMU with address translation capabilities.

There is also a long-felt need for a means to cost effectively accelerate the re-programming of region descriptors with lower-latency in a time-analysable way in real-time environments to support faster task-swapping and improved system performance.

There is also a long-felt need to support two-levels of address translation, in which each level of the address translation is under the control of different software (e.g. a hypervisor controls a first level of the MMU scheme and an operating system hosted on the hypervisor controls a second level of that MMU scheme), that is suitable for use in statically time-analysable real-time systems.

In resource constrained environments (such as the Internet of Things) that must run page based MMU schemes to support general purpose operating systems such as Linux, there is also a compelling market need for an innovative MMU architecture that requires less hardware circuit area to implement than conventional page-based MMU and that also supports faster execution of software after a user address space context swap.

Preferred embodiments of the present invention provide new and innovative solutions to the above mentioned market needs.

DISCLOSURE OF PREFERRED EMBODIMENTS OF THE INVENTION

There is a long-felt need for a means to cost effectively accelerate the re-programming of region-descriptors with lower-latency in a time-analysable way in real-time environments to support faster task-swapping and improved system performance.

FIG. 1 is a block schematic diagram illustrating portions of an apparatus (100) for processing data for a preferred embodiment of the present invention. The apparatus (100) comprises a processor unit (110). That processor unit (110) has an interconnect-master port (111) that is connected to the interconnect (190). Examples of a processor unit include, but are not limited to: a general-purpose 16-bit, 32-bit or 64-bit processor core; a graphics processor unit; or an application specific processor core. In principle, a interconnect-master peripheral could be employed instead of the processor unit (110).

The apparatus (100) further comprises a non-volatile memory store (112). That non-volatile memory store (112) is connected by its interconnect-target port (113) to the interconnect (190).

The apparatus (100) further comprises a programmable memory transfer request processing (PMTRP) unit (120). Examples of the functionality a PMTRP unit can implement include, but are not limited to: a page based memory management unit (MMU); a page based MMU with a translation look aside buffer to cache recently accessed page descriptors; a segment based MMU; a segment based MMU with a translation look aside buffer to cache recently accessed segment descriptors; a memory protection unit (MPU); and a cache, in which cache tags and cache data are stored in the programmable configuration data of the memory store (123) of the PMTRP unit (120).

A cache tag may comprise, but not be limited to, various of the following fields: a single-bit cache line present field; a (32-bit/64-bit) input address field; a (32-bit/64-bit) translated address field; multi-bit fields encoding access control policies for a user software task; multi-bit fields encoding access control policies for a system software task; multi-bit fields encoding access control policies for a interconnect-master peripheral; a single bit "cache-line present" flag; a present mask field with 8, 16 and/or 32 bit granularity; a "cache-line recently accessed for read" flag; a single bit "cache-line dirty" flag; a dirty mask field with 8, 16 and/or 32 bit granularity; a multi-bit cache mode field (e.g. write through, write back, and so on); a multi-bit memory order field to indicate memory consistency requirements in multi-bus master environments.

The apparatus (100) further comprises:

A programmable direct memory accessing (PDMA) unit (140).

An optional unidirectional interconnect bridge (160). The interconnect-master port (161) of that bridge (160) is connected to the interconnect (191). The interconnect-target port (162) of that bridge (160) is connected to the interconnect (192).

A SDRAM controller (115). The interconnect-target port (116) of that SDRAM controller (115) is connected to the interconnect (192).

A SDRAM memory store (118). The target port (119) of that SDRAM memory store (118) is connected to the master port of the SDRAM controller (115).

An on-chip SRAM memory store (170) with an interconnect-target port (171) and storage means (172).

A network interface peripheral (105). Both the interconnect-target port (106) and the interconnect-master port (107) of that network interface peripheral (105) are connected to the interconnect (192).

A High-Definition Multimedia Interface (HDMI) peripheral (180). Both the interconnect-target port (181) and the interconnect-master port (182) of that HDMI peripheral (180) are connected to the interconnect (192).

A dual port (188, 189) Universal Serial Bus (USB) peripheral (185). Both the interconnect-target port (186) and the interconnect-master port (187) of that USB peripheral (185) are connected to the interconnect (192).

A general purpose processor (194) with integrated core (199), MMU subsystem (197) and cache subsystem (199). That general propose processor (194) is connected via both the interconnect-master port (195) and the interconnect-target port (196) to the interconnect (292).

Collectively, the programmable memory transfer request processing (PMTRP) unit (120), the programmable direct memory access (PDMA) unit, the optional bridge (160) and the interconnect (191) can be described collectively as a composite programmable memory transfer request processing unit (165).

In this pedagogical description, the processor unit (110) is adapted to issue data memory transfer requests and/or code memory transfer requests from the interconnect master (111) to the interconnect (190).

The programmable memory transfer request processing (PMTRP) unit (120) has a control unit (121) which is adapted to access the run-time control unit (122) over a write port (126) and a read port (127). The run-time control unit (122) has a bank of one or more control registers (not illustrated). The PMTRP unit (120) is adapted to access memory store (123). The memory store (123) is adapted to store programmable configuration data for the PMTRP unit (120). That programmable configuration data is adapted to store at least two programmable region descriptor elements. The control unit (121) is further adapted to receive memory transfer requests on the interconnect-target (128) which is connected to the interconnect (190). That control unit (121) is further adapted to send memory transfer requests on the interconnect-master (129) which is connected to the interconnect (192). The control unit (121) is further adapted to process a memory transfer request associated with a first address space received on the interconnect-target port (128) in accordance with the at least one policy associated with that first address space that are encoded in the at least two or more programmable region descriptor elements stored in the programmable configuration data of the memory store (123) at the time of processing.

The programmable memory transfer request processing (PMTRP) unit (120) has an interconnect-target port (134) that is adapted to receive a memory transfer request to access a portion of the region descriptor elements stored within the programmable configuration data stored in the memory store (123). This includes a read means (132) and a write means (133) to permit and process well-formed memory transfer requests that are addressed to a valid memory location within that memory store (123) by the interconnect master (143) of the PDMA unit (140).

In preferred embodiments of the present invention, the interconnect-target port (134) of the programmable memory transfer request processing (PMTRP) unit (120) is also adapted to receive a memory transfer request to access a portion of the programmable configuration data stored in the memory store (123) that is not a region descriptor.

The PMTRP unit (120) has an interconnect-target port (124) that is adapted to receive read and write memory transfer requests to the run time control unit (122). That interconnect-target port (124) is connected to the interconnect (190). Alternatively, the PMTRP unit (120) has an interconnect-target port (136) that is adapted to receive read and write memory transfer requests to the run time control unit (122). That interconnect-target port (136) is connected to the interconnect (192).

The programmable direct memory access (PDMA) unit (140) has a first interconnect-master port (143) that is connected to the interconnect (191), a second interconnect-master port (144) that is connected to the interconnect (192) and an interconnect-target port (142) that is connected to the interconnect (192). The PDMA unit (140) is adapted to employ a bidirectional FIFO module (147). The first port of that FIFO unit (147) is connected to a first sub control circuit (145). The second port of that FIFO unit (147) is connected to a second sub control unit (146). The first sub control circuit (145) is adapted to issue memory transfer requests to the interconnect-master (143) and employs a counter (151) and a current memory address index (152). The second sub control circuit (146) is adapted to issue memory transfer requests to the interconnect-master (144) and employs a counter (153) and a current address index (154).

The PDMA unit (140) is adapted to be programmed by one or more memory transfer requests received on the interconnect-target port (142). In this pedagogical illustration, the PDMA unit (140) has one programmable memory-to-memory transfer descriptor (148, 149, 150). That memory-to-memory transfer descriptor (148, 149, 150) has three fields: a source memory address field (148), a target memory address field (149) and a memory transfer length field (150). The memory-to-memory transfer descriptor is programmed by writing to fields (148) then (149) and then (150) in that order.

The PDMA unit's (140) memory-to-memory transfer operation begins after all three fields (148, 149, 150) of the memory-to-memory transfer descriptor are written to. This operation is performed as follows. The value of the source address (148) is loaded into the current address pointer (151, 153) of one of the two sub control circuits (145, 146). The target address (149) is loaded into the current address pointer (151, 153) of the other one of the two sub control circuits (145, 146). For example, the high-bit of the source address (148) could be used to indicate which master port (143, 144) of the PDMA unit (140) that source address is associated with.

Alternatively the PDMA unit (140) is adapted to compare the source address against the different memory address ranges associated with each of its master ports (143, 144) to determine which master port that source address is associated with. The value of the memory transfer length field (150) is then copied into both of the counter fields (151, 153). The FIFO unit (147) is reset to ensure there are no elements of data present in the queue of that FIFO unit. The two sub control circuits (145, 156) are then instructed by the control unit (141) to start read or writing as required to successfully execute the requested memory-to-memory transfer operation. The words of memory read from the source address are pushed into the FIFO unit (147). The words of memory to be written into the target address are popped out of the FIFO unit (147). The value of the counters (251) and (253) are decremented according to the amount of data read or written respectively. The process for the sub-control unit (145) completes when the value of its counter field (151) is zero. The process for the sub-control unit (146) will complete when the value of its counter field (153) is zero.

FIG. 2 is a block diagram (200) illustrating the partitioning of an address space (201) for accessing the programmable configuration data that is stored in the memory store (123) of the PMTRP unit (120) illustrated in FIG. 1 according to a preferred embodiment of the present invention. That memory address space (201) is divided into 12 fields (210 to 221). Each field (210 to 221) is 32-bits in length. That address space (201) is logically partitioned into:

a first contiguous set (202) of 6 fields (210 to 215) associated with the configuration of the system part of the address space of the target port (128) of the PMTRP unit (120); and a second contiguous set (203) of 6 fields (216 to 221) associated with the configuration of the user portion of the address space of the target port (128) of the PMTRP unit (120).

Field (210) stores configuration and/or state information associated with the system address space (202). Fields (211) to (214) are adapted to store at least one region descriptor associated with the system address space. The PMTRP unit (120) is adapted such that writing any value to the fields (210) to (214) notifies the PMTRP control unit (121) that the configuration data for the system portion (202) of the address space is currently being re-programmed. The PMTRP unit is adapted such that writing any value to field (215) notifies the PMTRP control unit (121) that the configuration data for the system portion of the address space has finished being re-programmed.

Field (216) stores configuration and/or state information associated with the user address space (203). Fields (216) to (221) are adapted to store at least one region descriptor associated with the user address space. The PMTRP unit (120) is adapted such that writing any value to the fields (216) to (221) notifies the PMTRP control unit (121) that the configuration data for the user portion (203) of the address space is currently being re-programmed. The PMTRP unit (120) is adapted such that writing any value to field (221) notifies the PMTRP control unit (121) that the configuration data for the user portion of the address space has finished being re-programmed.

This novel configuration of the address space (201) of the programmable configuration data stored in the memory store (123) of the PMTRP unit (120) permits: all of the system data to be updated using a contiguous memory-to-memory transfer operation (over fields 210 to 215); all of the user data to be updated using a contiguous memory-to-memory transfer operation (over fields 216 to 221); and all of both the system data and user data to be updated using a contiguous memory-to-memory transfer operation (over fields 210 to 221).

Advantageously this permits very fast re-programming of the configurable data of the PMTRP unit (120) by the PDMA unit (140) in a novel way.

In a further preferred embodiment of the present invention, when the apparatus (100) is reset, the PMTRP unit (120) resets the state of its run-time control unit (122) and resets the state of its programmable configuration data (123). Furthermore, the default mode of operation for the PMTRP unit (120) is to relay memory transfer requests received on the target port (128) without modification to the master port (129) and to relay memory transfer responses receive on the master port (129) without modification to the target port (128). The PMTRP unit is then ready to receive memory transfer requests on port (124), (136) and (134) to configure its operation.

FIG. 3 is a flow chart (300) illustrating a memory-to-memory transfer operation performed by the PDMA unit (140 of FIG. 1) to program all of the programmable configuration data stored in the memory store (123 of FIG. 1) of the PMTRP unit (120 of FIG. 1) in one memory-to-memory transfer operation (148, 149, 150 of FIG. 1). In this example the processor module (110 of FIG. 1) is a processor core. The PMTRP unit (120 of FIG. 1) implements the functionality of a memory management unit. In this flow chart, the PMTRP unit (120) and processor core (110) are already initialised.

Label (301) illustrates a sequence of steps (301, 305, 308, 311, 314, 330, 331, 334) performed by the processor core (110). Label (302) illustrates a sequence of steps (302, 306, 309, 312, 315, 321, 323, 327, 328, 329, 332, 335) performed by the PMTRP unit (110). Label (303) illustrates a sequence of steps (303, 307, 310, 313, 316, 317, 320, 322, 326, 336) performed by the PDMA unit (140). Label (304) illustrates a sequence of steps (304, 318, 319, 324, 325, 337) performed by the SDRAM store (115, 118).

The flow chart (300) starts on steps (301), (302), (303), and (304).

In step (305) the processor core (110) issues a 32-bit write memory transfer request addressed to the "source memory address" field (148) of the PDMA unit (140). That memory transfer request is received on the target port (128) of the PMTRP unit (120) in step (306). The PMTRP unit (120) processes that memory transfer request according to the memory translation address policies that are associated with that target port (128) and that are stored in programmable configuration data stored in the memory store (123). The PMTRP unit (120) on-forwards that processed memory transfer request to the PDMA unit (140) over the master port (129) and then over the interconnect (192). The PDMA unit (140) then receives that memory transfer request on its target port (142) in step (307). The PDMA unit (140) writes the data field of that memory transfer request into its "source memory address" field (148).

In step (308) the processor core (110) issues a 32-bit write memory transfer request addressed to the "target memory address" field (149) of the target port (142) of the PDMA unit (140). That memory transfer request is processed and on-forward by that PMTRP unit (120) to the PDMA unit (140) in step (309). In step (310), that PDMA unit (140) receives that memory transfer request and writes the data of that memory transfer request into its "target memory address" field (149).

In step (311) the processor core (110) issues a 32-bit write memory transfer request addressed to the "memory transfer length" field (150) of the PDMA unit (140). That memory transfer request is processed and on-forward by the PMTRP unit (120) to the PDMA unit (140) in step (312). In step (313), that PDMA unit (140) receives that memory transfer request and writes the data of that memory transfer request into its "length memory address" field (150). A memory-to-memory transfer operation is initiated when the memory transfer length field (250) is written to.

In step (314) the processor core (110) issues a read memory transfer request addressed to a memory location within the address space of the target port (124) of the PMTRP unit (120) that will result in that PMTRP unit (120) issuing a read-response after both the system and user portion of the programmable configuration data of that PMTRP unit have been completely updated. That memory transfer request is received and processed in step (315). The corresponding memory transfer response will be issued in step (329) below.

In step (316) the value of the "source memory address" (148) is loaded as the value of the current address pointer (153). The value of the "target memory address" (149) is loaded as the value of the current address pointer (151). The value of the "memory transfer length" (150) is loaded as the value of the counter field (151) and the value of counter field (153). The FIFO unit (147) is reset to ensure there are no elements of data present in the queue of that FIFO unit. The sub-control circuit (145) is instructed to start the process of reading data from the source memory. The sub-control circuit (146) is instructed to start the process of writing data to the target memory.

In step (317) the sub-control circuit (146) issues a burst memory read memory transfer request over port (144) to read the first half of the requested message length (150). A burst memory transfer request is memory transfer request that is adapted to operate on two or more words of data. That burst read memory transfer request uses the value of the "current address pointer" (151). That read burst memory transfer request is received and processed by the SDRAM store in step (318). The requested data is issued by the SDRAM store back to the master port (144) of the PDMA unit (140) in the form of a burst memory transfer response in step (319).

In step (320) the PDMA unit (140) receives a read burst memory transfer response on master port (144) which contains the requested data. That data is pushed into the FIFO unit (147). The value of the "current address pointer" (154) is increased, and the value of the counter (153) is decreased according to the amount of data received.

In step (320) the sub control unit (145) pops that data out of the FIFO unit (147) and issues a write burst memory transfer request addressed to the target port (134) of the PMTRP unit (120) using the value of the "current address pointer" (152). The value of the "current address pointer" (151) is increased, and the value of the counter (152) is decreased according to the amount of data written.

In step (321) the PMTRP unit (120) receives that burst write memory transfer request on the target port (134) and writes the data it receives into the programmable configuration data stored in the memory store (123). The PMTRP control unit (121) actively tracks when the system and user portions of the programmable configuration data stored in the memory store (123) are being updated, and actively tracks when the configuration of the system and user portions of that programmable configuration data are finalised as described in the text describing FIG. 2.

In step (322) the PDMA unit (140) has received all the data requested by its burst memory read memory transfer request issued in step (317). The sub-control circuit (146) issues a burst memory read memory transfer request over port (144) to read the second half of the requested memory length (150). That burst read memory transfer request uses the value of the "current address pointer" (151).

In step (322) the sub control unit (145) of the PDMA unit (140) continues to on-forward any outstanding data stored in the FIFO unit (147) to the PMTRP unit (120). This may or may not involve issuing additional write memory transfer requests as required.

In step (324) the read burst memory transfer request issued in step (322) is received and processed by the SDRAM store. In step (325) the requested data is issued by the SDRAM store back to the master port (144) of the PDMA unit (140) as burst memory transfer response.

In step (326) the PDMA unit (140) continues to on-forward data to the PMTRP unit (120). The sub control circuit (146) of the PDMA unit (140) stops when the value of it its counter (153) is zero. The sub control circuit (145) of the PDMA unit (140) stops when the value of it its counter (151) is zero. When both sub control circuits (146) and (145) stop the PDMA unit's (140) memory-to-memory transfer operation has completed (at least as far as that PDMA unit is concerned).

In step (327) the PMTRP unit (120) continues to receive and process the write memory transfer data as issued by the master port (143) of the PDMA unit (140).

In step (328) the PMTRP unit (120) has been successfully re-programmed. The PMTRP unit (120) will now service memory transfer requests received on the target port (128) of the PMTRP unit (120) according to the policies that are now encoded in the programmable configuration data of the memory store (123) of that PMTRP unit.

In step (329) the run-time control unit (122) of the PMTRP unit (120) sends a read memory transfer response with the value 1 in the read data field back to the processor core (110). This notifies the processor core that the PMTRP unit (120) has been fully re-programmed. In step (330) the processor core (110) receives that memory transfer response.

In step (331) the processor core (110) issues a write memory transfer request addressed to the input address space of the target port (128) of the PMTRP unit (120). In step (332) that write memory transfer request is received on the target port (128) of the PMTRP unit (120) and processed by its control unit (121) according to the policies that are currently stored in the programmable configuration data stored in the memory store (123) of that PMTRP unit.

The flow chart stops on labels (334), (335), (336), and (337).

In an alternate preferred embodiment of the present invention: the PMTRP unit (120) of FIG. 1 is tightly coupled with the processor core (110) of FIG. 1; the memory store (112) of FIG. 1 is decoupled from the interconnect (190) of FIG. 1 and coupled to the interconnect (192) of FIG. 1; the bus target (124) of the PMTRP unit (120) FIG. 1 is not employed; and the bus target (136) of the PMTRP unit (120) FIG. 1 is employed.

There is a long-felt need for an MMU architecture that has low-latency, high-throughput, constant time operation with support for relatively fine-grain memory allocation in 32-bit and 64-bit input address spaces.

FIG. 4 is a hybrid block schematic diagram and data flow diagram partially illustrating a preferred embodiment of the present invention in which the PMTRP unit (120) of FIG. 1 is adapted to implement the functionality of a memory management unit (MMU).

That MMU (120) employs an innovative single-level direct indexed segment based memory address translation scheme that is adapted for use with large input address spaces (e.g. in this case, a 31-bit input address space (414)) in which there are a small number of segment descriptors associated with the input address space (414), and each of the segments descriptors support fine-grain memory allocation (533) within that segment. This innovative memory address translation scheme is intended for use with a range of memory organisation schemes including, but not limited to, those described with reference to FIG. 6 and FIG. 8. In particular, our innovative memory organisation scheme described with reference to FIG. 8 synergistically exploits the combination of: a large input address space; and (b) a low number of region descriptors that provide a means for fine-grain memory allocation, to provide an unexpected solution to the address space size scaling problem associated with other single-level direct indexed memory address translation schemes [1], [2]. Advantageously, one hardware implementation of the PMTRP unit (120) can support both of the memory organisation schemes described in FIG. 6 and FIG. 8.

This scheme can be trivially adapted for use with large input address spaces that are larger, equal to, or smaller than the output address space.

The region descriptors of the PMTRP unit (120) are adapted to encode segment descriptors with the fields as illustrated for the segment descriptor (430).

Label 410 illustrates the fields of a memory transfer request received on the interconnect-target port (128) of the PMTRP unit (120). That memory transfer request (410) is illustrated with fields (411), (412) and (414). Field (411) encodes a 3 bit control field for that memory transfer request (410). Those three bits encode "read for data", "write" and "read for execute" operations respectively. Field (412) encodes a 1 bit privilege value indicating either system-level privilege or user-level privilege for that memory transfer request (410). Field (414) encodes the value of a 31-bit input address in the input address space. The 5 most significant bits (415) of the 31-bit input address (414) is employed as the segment index selector. The remaining 26-bits (416) of the 31-bit input address (414) are employed as a displacement offset within that segment (415).

A single-level direct-indexed segment descriptor lookup module (420) stores a table of 32 segment descriptors that can be programmed at run-time. The segment descriptors of that table are indexed at run-time by the top 5 bits (615) of the input address (614) of the memory transfer request received on the interconnect-target port (128) of the PMTRP unit (120).

Each segment descriptor, as illustrated by the segment descriptor (430), is comprised of 5 fields (431), (432), (434), (435) and (436). The segment descriptor (430) is a total of 64-bits in length. In this embodiment of the present invention, that segment descriptor (430) supports a 31-bit input address space that can address 2^31 bytes of storage. That segment descriptor (430) also supports a 31-bit output address space that can address 2^31 bytes of storage. The fields (431 to 436) of the segment descriptor (430) are as follows. Field (431) encodes 6 bits of metadata associated with that segment descriptor. Field (432) encodes a 29-bit long displacement offset within the translated address space. Reducing the number of bits of field (432) reduces the physical address space size that the input address space can be mapped to. This in turn can reduce the hardware resources required to store the segment descriptors. Field (434) encodes a 24-bit allocated segment length with 8 byte granularity. Field (433) logically extends the 24-bit allocated segment length to a 29-bit allocated segment length value (437). Specifically, the binary value zero is stored in each of the top 5 bits (433) of that 29-bit allocated segment length value (437). Field (435) encodes a 3-bit permission field for the user privileged access. Those three bits encode "read for data", "write" and "read for execute" permissions respectively. Field (436) encodes a 3-bit permission field for the system privileged access. Those three bits encode "read for data", "write" and "read for execute" permissions respectively.

The output of the segment descriptor lookup module (420) is supplied as input to the memory transfer request re-assembly and permission check module (440). That module (440) comprises a 29-bit wide arithmetic addition operation which: receives as input the 29 most significant bits (417) of the 31-bit displacement field (416) of the memory transfer request (410); receives as input the 29-bit displacement offset (432) within the translated address space for that segment descriptor (430); and generates a 29-bit value as output that is employed as the most significant 29-bits (454) of the 31-bit address (454, 454) of the translated memory transfer request (413).

The memory transfer request re-assembly and permission check module (440) further comprises a permission checking module (442) which:

Checks that the value of the displacement offset (416) of the memory transfer request (410) is less than or equal to the 29-bit segment length (437) of the segment descriptor (430) that is associated with that memory transfer request (410); and Checks that the 3 bit control field (411) and 1 bit privilege field (412) of the memory transfer request (410) is permitted by the permission policies encoded in the fields (435) and (436) of the segment descriptor (430) that is associated with that memory transfer request (410). If that permission check fails, a fault signal is issued (443). In preferred embodiments of the present invention, that fault signal may result in an interrupt being issued to a processor core (110).

The value of the metadata field (431) of that segment descriptor (430) is employed as the metadata field (453) of the translated memory transfer request (413). In a preferred embodiment of the present invention the meta-data field (431) is adapted to encode:

A single bit cascade field for conditionally enabling an additional level of memory address translation by an additional memory address translation means;

4 bits to control the memory subsystem, including: the selection of the cache mode (e.g. write through, write back); and the memory order requirements for maintaining memory coherency.

The value (413) of the 3 bit operation (411) and 1 bit privilege filed (412) of the memory transfer request (410) is supplied as the value of the 3 bit operation (451) and 1 bit privilege field (452) of the translated memory transfer request (413) respectively.

The value of the lower 2 bits (418) of the address (416) of the input memory transfer request (410) are supplied as the value of the lower 2 bits (454) of the translated memory request (450).

FIG. 5 is a flow chart (500) illustrating the steps of a memory address translation operation performed by the control unit (121) of the PMTRP unit (120) according to a preferred embodiment of the present invention.

The flow chart starts in step (501).

In step (502) a memory transfer request is received by the control unit (121) of the PMTRP unit (120) on port (128).

In step (503) the five most significant bits (415) of the address (414) of that memory transfer request (410) are supplied as the index to the segment descriptor lookup module (420). The segment descriptor lookup module (420) releases as output the value of the segment descriptor (430) associated with that index value. The output of segment descriptor lookup module (420) is received by the reassembly and permission check module (440).

In step (504) the permission checking module (442) performs consistency checks between the memory transfer request (414) received in step (502) and the corresponding segment descriptor issued in step (503).

In step (505) if the consistency check of step (504) fails then go to step (506) otherwise go to step (509).

In step (506) generate a permission check fault event signal on port (443).

In step (507) if the memory transfer request (410) received in step (502) is a write memory transfer request then go to step (515) otherwise go to step (508).

In step (508), issue a read memory transfer response. The value zero is stored in the data field of that memory transfer response. If the interconnect protocol offers the capability, return an error status for that memory transfer request. Go to step (515).

In step (509) perform the 29-bit wide addition operation (441) and assemble the fields of the translated memory transfer request (450) as described in the text describing FIG. 4.

In step (510) if the memory transfer request received in step (502) is a write memory transfer request then go to step (511) otherwise go to step (512).

In step (511) issue the write memory transfer request on master port (129) of the PMTRP unit (120). Go to step (515).

In step (512) issue the read memory transfer request on master port (129) of the PMTRP unit (120).

In step (513) receive the corresponding read memory transfer response on the master port (129) of the PMTRP unit (120).

In step (514) on-forward the results of that read memory transfer response received in step (513) on the target port (128) of the PMTRP unit (120).

The flow-chart stops in step (515).

FIG. 6 is a block diagram (600) illustrating an example mapping of a segment based address translation scheme between an input address space (610) and a translated address space (630) according to a preferred embodiment of the present invention. In this diagram (600), the input address space (610) starts at zero at the top-left corner of the rectangle (610) and ends at the bottom-right corner of that rectangle (610). In this diagram (600), the target address space (630) starts at zero at the top-left corner of the rectangle (630) and ends at the bottom right corner of that rectangle (630). The linear input address space (610) is subdivided into N=8 partitions of equal length (611 to 618). In this illustration, the offset of a segment in the input address space partition can be mapped into any location of the output address space with 8-byte granularity (e.g. label 632). The allocated length of a segment also has 8-byte granularity (e.g. labels 634, 837, 838).

The segment descriptor for partition (611) is illustrated as allocating the entire length of that partition (611) and translating its base-offset into a higher address (631) in the target address space (630). The segment descriptor for partition (612) allocates the top portion of that partition (612) and translates its base-offset into a higher address (632) in the target address space (630). The allocated portions of the first segment (611) and second segment (612) are contiguous in the input address space. The segment descriptor for partition (613) allocates no portion of that partition. The segment descriptor for (614) allocates the top portion of that partition (614) and translates its base-offset into the same address (634) in the target address space (630).

The segment descriptor for partition (615) allocates no memory of that partition. The segment descriptor for partition (616) allocates no memory of that partition.

The segment descriptor for (617) allocates a small region in the top portion of that partition (617) and translates its base-offset into a lower address (637) in the target address space (630). The segment descriptor for (618) allocates a larger region in the top portion of that partition (618) and translates its base-offset into a lower address (638) in the target address space. In this illustration, the segment descriptor for partition (617) is adapted with a permission access policy that permits user writes to that allocated region of memory, and the segment descriptor for partition (618) is adapted with a permission access policy that permits un-cached user reads to the same portion of the translated address space.

In this way we can see that all the variable length segments in the input address space start on a partition boundary which permits low-latency hardware-efficient indexing of that segment descriptor (when compared to employing a table of range descriptors as illustrated with label 123 of FIG. 21). The 8-byte granularity of the allocated length of the segment and the 8-byte granularity of the displacement offset permits more efficient packing of an input address space to a translated memory address space than is possible with 4 kibibyte long pages as found in many conventional MMUs. This fine granularity of mapping into the translated address space is particularly desirable in embedded micro applications that have highly constrained memory storage capacities.

FIG. 7 is a block diagram (670) illustrating the organisation of the input address space (701) of the single-level direct mapped page based scheme for the DEC VAX-11/760 architecture as described in FIG. 6-1 of [3]. Each page descriptor is mapped to a contiguous region of 512 bytes of the 32-bit input address space. The input address space (701) is equally partitioned into a process space (702) and a system space (702). The user space (702) is dynamically partitioned into a first region (710) called "P0" and a second region (711) called "P1". Region P0 starts at the top of the user space and grows downwards. Region P1 starts at the bottom of the user space and grows upwards. The system space (703) is dynamically partitioned into a first region (712) called "system region" and a "reserved region". The system region (712) starts at the top of the system space and grows down. This memory organisation was chosen by DEC to limit the size of the single-level direct-indexed tables that store the page descriptors for the three regions (P0, P1, system region) that support memory address translation [3].

FIG. 8 is a block diagram (670) illustrating an innovative organisation of an input address space (701) for a single-level direct mapped segment based scheme for preferred embodiments of the present invention. In this example let us consider an M-bit input address space (801) equally partitioned into N=8 segments (811 to 818). The top 4 segments (811, 812, 813, 814) are associated with a system space (803) and the bottom 4 segments (815, 816, 817, 818) are associated with a user space (802).

Where the input-address space is M=32 bits, a single region descriptor can map 512 mebibytes of the translated address space. The vast majority of real-time embedded systems have less than 512 mebibytes of physical memory. In this case, those embedded systems could map the entire storage capacity of the physical memory to one region-descriptor. This avoids the need to map 2 or more segment descriptors to access any contiguous region of the physical memory. Many safety critical real-time operating systems statically allocate the memory available to each application running on that RTOS at power on. This means that many of the region descriptors for the system space and each application space of that RTOS instance can be created statically before that device is powered on. For example: The executable code of the RTOS can be mapped to partition (811) with system privileged read-only permission access. The BSS, Stacks and Heap of that RTOS can be mapped to partition (812) with system privileged read/write permission access. The segment (813) can map the entire main-memory into a contiguous memory region in the input address space to support memory-to-memory copy functions executed by the processor core. The segment (814) can be left unmapped at power on. The executable code of a first application can be mapped to partition (815) with user privileged read-only permission access. The BSS, Stack and Heap of that first application can be mapped to partition (816) with user privileged read/write permission access. A first region of memory shared between the first application and a second application can be mapped with user privileged read/write permission access in segment (817). A second region of memory shared between the first application and a second application can be mapped with user privileged read only permission access in segment (818). This static mapping does not preclude the ability to also perform dynamic mapping at run-time.

Increasing the number of region descriptors from N=8 to N=16 supports a considerably more nuanced organisation of memory while still maintaining very small region-descriptor table for both the system space (802) and user space (803). The full contents of the region-descriptor table can be easily stored in on-chip SRAM for low-latency high-throughput access. Increasing the size of the input address space from 32 to 64-bits while simultaneously holding the size of the target address space constant does not increase the storage requirements of the region descriptor table.

This innovative memory organisation (800) that has been co-designed with our PMTRP unit that employs an innovative segmentation scheme for large input address spaces permits constant time memory address translations with very low circuit area overheads, making it ideally suited for resource constrained safety-critical cyber-physical applications.

In a preferred embodiment of the present invention, a 4 kibibyte fixed page based MMU scheme is employed as the second level of conditionally enabled memory address translation means.

There is a long-felt need to support two-levels of address translation, in which each level of the address translation is under the control of different software (e.g. a hypervisor controls a first level of the MMU scheme and an operating system hosted on the hypervisor controls a second level of that MMU scheme), that is suitable for use in statically time-analysable real-time systems.

FIG. 9 is a block diagram (900) illustrating two-levels of memory management means according to a preferred embodiment of the present invention. Diagram (900) illustrates a PMTRP unit (910) and a MMU (920).

In preferred embodiments of the present invention, the contents of the programmable configuration data of the PMTRP unit (910) is controlled by a software hypervisor running on a processor core. That processor core issues one or more memory transfer requests to the target port (911) of the PMTRP unit (910) to configure the programmable configuration data of that PMTRP unit (910).

The contents of the programmable configuration data of the MMU unit (920) is jointly controlled by the operating system hosted on the hypervisor in a virtual machine and that hypervisor's executive software. The operating system running on that software hypervisor defines the policies that the operating system requires for its own internal operation. Those policies are encoded and written to the target port (912) of the PMTRP unit (910). Then those policies are transformed by the policies in the PMTRP unit (910) that are controlled by the hypervisor's executive software. Those transformed policies are then written by the PMTRP unit (910) into the programmable configuration data of that MMU unit (920).

Specifically, the PMTRP unit (910) is adapted to receive and process memory transfer requests received on its target port (912) according to the policies encoded in the programmable configuration data of the PMTRP unit (910). Those policies in the programmable configuration data of the PMTRP unit (910) encode how to perform a memory address translation of the one or more region descriptors that are received on the target port (912) and that are intended to be written into the programmable configuration data of the MMU (910) on its target port (921). Those transformed policies are then written by the PMTRP unit (910) into the programmable configuration data of that MMU unit (920) using target port (921).

For example, the policies encoded in the PMTRP unit (910) may specify a contiguous region of the input address space of target port (922) that can be accessed by memory transfer requests received on the target port (922) along with a relative offset to translate all of those addresses into the translated address space of the master port (923).

The MMU (920) is adapted to receive memory transfer requests on its target port (922) and translate their addresses according to the policies encoded in the programmable configuration data of that MMU unit (920).

In this way, the memory address translation scheme written into the programmable configuration data of MMU (920) is logically equivalent to performing two-levels of memory address translation serially (operating system level memory address translation followed by software hypervisor level memory address translation). Advantageously, two-levels of address space translation can be achieved at run time by the MMU (920) with the latency of performing a single level of address space translation.

FIG. 10 is a block diagram (1000) illustrating various fields that may be present in a memory transfer request (1010) and a memory transfer response (1040) according to a preferred embodiment of the present invention.

With regard to the memory transfer request (1010), the optional field (1011) encodes a device group identifier that identifies a group of interconnect-master devices. Optional field (1012) encodes the device type (such as a network interface, a graphics processor unit, and so on). Optional field (1013) encodes the device identifier. Optional field (1014) indicates the coherency policy (such as un-cached, default cache policy, write-only cache, write-back cache, and so on) of this memory transfer request. Optional field (1015) encodes the memory ordering policy (total store order, relaxed-memory order, partial store order, and so on). Optional field (1016) encodes an interconnect lock request flag. Optional field (1017) encodes a "read for data" operation. Optional field (1018) encodes a "write" operation. Optional field (1019) encodes a "read for execute" operation. Optional field (1020) encodes the length of this memory transfer request. Optional field (1021) encodes an address space identifier associated with this memory transfer request. Field (1022) encode the address of the memory to access. Optional field (1023) encodes the data to write as part of a write memory transfer request. Optional field (1024) encodes the byte enable mask for a write memory transfer request. Optional field (1025) encodes the privilege level of this memory transfer request.

With regard to the memory transfer response (1040), the optional field (1041) encodes a result code for the associated memory transfer request (1010). The optional field (1042) encode a 1-bit value indicating if the read data associated with this response is valid. The optional field (1043) stores the read-data associated with a read memory transfer request (1010). The optional field (1044) encodes a read byte enable mask.

In a preferred embodiment of the present invention, the PMTRP unit (120) is adapted with means to identify the originating interconnect-master that issued a memory transfer request received on its target port (128) using one or more fields (1012) of the memory transfer request (1010). In a preferred embodiment of the present invention, the PMTRP unit (120) is adapted with means to identify the device group of the originating interconnect-master that issued a memory transfer request received on its target port (128) using one or more fields (1011) of that memory transfer request (1010). In a preferred embodiment of the present invention, the PMTRP unit (120) is adapted with means to identify the type of the originating interconnect-master that issued a memory transfer request received on its target port (128) using one or more fields (1012) of that memory transfer request (1010). In a preferred embodiment of the present invention, the PMTRP unit (120) is adapted with means to associate an address space identifier with a memory transfer request received on its target port (128) using one or more fields (1011, 1012, 1013, 1021) of that memory transfer request. In a preferred embodiment of the present invention the policies encoded in at least one region descriptor the programmable configuration data of the PMTRP unit (120) is associated with one or more of the fields (1011, 1012, 1013, 1016, 1021) of the memory transfer request received on the target port (128).

There is a long-felt need for an MMU architecture that has low-latency, high-throughput, constant time operation with support for relatively fine-grain memory allocation in 32-bit and 64-bit input address spaces. There is also a long-felt need for a means to cost effectively accelerate the re-programming of region descriptors with lower-latency in a time-analysable way in real-time environments to support faster task-swapping and improved system performance. We will now describe a preferred embodiment of FIG. 1 in which the PMTPR unit (120) is adapted with a page based MMU scheme.

FIG. 11 is a hybrid block schematic diagram and data flow diagram partially illustrating a preferred embodiment (1100) of the present invention in which the PMTRP unit (120) of FIG. 1 is adapted to implement the functionality of a partitioned single-level direct indexed page based memory management unit (MMU). In this illustration, the PMTRP unit (120) employs 8 partitions (1151 to 1158). Those 8 partitions (1151 to 1158) can be described as 8 independent memory transfer request processing regions. Each of those partitions is backed by a single-level direct indexed table of 64 region descriptors. Each of those 512 region descriptors are variable-length page descriptors which provide fine grain memory allocation. Each of those 512 region descriptors can be stored in one physical memory store (1150).

Label 1101 illustrates the fields a memory transfer request received on interconnect-target port (128) of the PMTRP unit (120).

That memory transfer request (410) is illustrated with fields (1106), (1107), (1102) and (1105). Field (1106) encodes a 2 bit privilege field with the following 3 privileges: user privilege for software, supervisor privilege for software, and access privilege for interconnect-master peripherals.

Field (1107) encodes the selection of one of 5 spaces in 3 bits.

Field (1102) encodes a 32-bit input address. The 2 most significant bits (1110) of the 32-bit input address (1102) sub divide that address space (1120) into four spaces: a interconnect-master private space (1211), a system space (1122), a high user space (1123) and a low user space (1124). The next 6 most significant bits (1111) of the 32-bit input address (1102) sub divide each of the spaces (1121, 1122, 1123, 1124) into 64 spaces. The remaining 24 bits (1112) of the 32-bit input address (1102) provide an offset within the top 8 bits (1103) of the 32-bit input address (1102).

Field (1105) encodes a 3-bit control field for that memory transfer request (410). Those 3 bits encode "read for data", "write" and "read for execute" operations respectively.

The partition selection module (1130) receives as input the value of the fields (1106), (1107), (1110) and (1111). The partition selection module (1130) is adapted to:
Release output (1140) that indicates a fault during partition selection.
Release output (1131) that indicates if no memory address translation is required. That output (1131) being supplied as input to the reassembly and permission check module (1170).
Release output that indicates which partition of the 8 partitions (1151 to 1158) to use for the translation of the 32-bit address (1102) of the memory transfer request (1101). That output being provided as input to the partitioned one-level direct indexed page descriptor lookup module (1150).

The partitioned one-level direct page descriptor lookup module (1150) has 8 partitions (8 independent memory transfer request processing regions). Each of those 8 partitions has a table of 64 page descriptors that can be programmed at run-time. The choice of partition to employ when performing a memory address translation is selected at run-time by the partition selection module (1130) for each memory transfer request (1101) received on the target port (128).

In preferred embodiments of the present invention, the mapping of the 5 spaces (1107) of the memory transfer request (1101) to the 8 partitions (1151, 1152, 1153, 1154, 1155, 1156, 1157, 1158) of the partitioned one-level direct-mapped page descriptor lookup (1150) is statically mapped by the implementation of the partition selection module (1130). This simple static mapping can easily be implemented using combinatorial logic with very low hardware circuit resources and at very high speed at run-time.

The arrows drawn within the partition selection module (1130) of FIG. 11 illustrates the following pedagogical mapping of input spaces and partitions:
The interconnect-master private space (1121) is not mapped to any of the 8 partitions (1151 to 1158).
The system level space (1122) is always mapped to the partition (1158). In preferred embodiments of the present invention, a fault (1140) is signalled if the privilege level (1106) of that memory transfer request (1101) does not have system level privilege.
If the value of space selection field (1107) of the memory transfer request (1101) is 0, the low user space (1124) is mapped to the partition (1151) and the high user space (1123) is mapped to partition (1152). In this way, the entire user space (1123, 1124) can be allocated.
If the value of space selection field (1107) of the memory transfer request (1101) is 1, the low user space (1124) is mapped to the partition (1153) and the high user space (1123) is mapped to partition (1154). In this way, the entire user space can be allocated.
If the value of space selection field (1107) of the memory transfer request (1101) is 2, the low user space (1124) is mapped to the partition (1155) and the high user space (1123) is not mapped to any partition.
If the value of space selection field (1107) of the memory transfer request (1101) is 3, the low user space (1124) is mapped to the partition (1156) and the high user space (1123) is not mapped to any partition.
If the value of space selection field (1107) of the memory transfer request (1101) is 4, the low user space (1124) is mapped to the partition (1157) and the high user space (1123) is not mapped to any partition.
Software running on a processor core is responsible for:
mapping the address-spaces managed by an executive system to the 5 spaces (1107) of the memory transfer request (1107) managed by the partition selection module (1130);

programming the page descriptors of the partitioned one-level direct-mapped page descriptor look up module (1150); and changing the value supplied to the space selection field (1107) of a memory transfer request (1107) during an address-space context swap of that executive system.

The 5 most recently scheduled user applications with low memory storage requirements running on an executive system can be mapped to any of the 5 spaces of the partition selection module (1130).

Very low-latency task-swapping between those 5 spaces can be achieved by the executive system by simply changing the value supplied to the space selection field (1107) of the memory transfer request (1107). For example, a processor core (110) may be adapted with a configuration register that determines the value of the space selection field (1107) that will be used by that processor core when it issues memory transfer requests.

The 2 most recently scheduled user applications with high memory storage requirements running on an executive system can be mapped to the 2 spaces of the partition selection module (1130) that are mapped to two partitions of the page descriptor lookup module (1150).

The page descriptor lookup module (1150) is adapted to release the value of the selected page descriptor as input to the reassembly and permission check module (1170).

The reassembly and permission check module (1170) also receives as inputs the value of the 2 bit privilege field (1106), 3 bit space selector field (1107), the 8 most significant bits (1103) of the 32-bit input address, the 24 least significant bits (1112) of the 32-bit input address and the 3-bit control field (1105) of the input memory transfer request (1101). The reassembly and permission check module is adapted to:

release a single bit output (1172) that indicates a fault during processing of a memory transfer request;

release the value of the translated memory transfer request as output (1173); and release a single bit cascade output (1171) that indicates an additional level of memory address translation is required for the translated memory transfer request.

The translated address space (1190) illustrates that:

the top quarter (1191) of the translated address space (1190) is associated one-to-one with the interconnect-master private space (1211) of the input address space (1120); and the bottom three quarters (1192) of the translated address space (1190) is associated with the system space (1122), high user space (1123) and low user space (1124) of the input address space (1120).

FIG. 12 is a hybrid block schematic diagram and data flow diagram partially illustrating a preferred embodiment of the present invention in which the PMTRP unit (120) of FIG. 1 is adapted to implement the functionality of a memory management unit (MMU). That MMU employs a single-level direct indexed page based memory address translation scheme with a large input address space and a relatively small number of page descriptors.

This scheme can be trivially adapted for use with large input address spaces that are larger, equal to, or smaller than the output address space.

In this case, the region descriptors of the PMTRP unit (120) are adapted to encode page descriptors, as illustrated by the page descriptor (1210). FIG. 12 employs the memory transfer request (1101) and its fields (1102), (1103), (1104), (1105), (1106), (1107) and (1129) as described in the text describing FIG. 11. FIG. 12 also employs the partition selection module (1130) and the partitioned one-level direct indexed page lookup module (1129) and its outputs (1131), (1140), (1171) and (1172) as described in the text describing FIG. 11.

Each page descriptor, as illustrated by the page descriptor (1210), is comprised of 7 fields (1121), (1212), (1213), (1214), (1215), (1216) and (1217). The page descriptor (1210) has a total length of 32-bits. That page descriptor (1210) supports an input address space of 2^32 bytes and supports an output address space of 2^32 bytes. The fields of this page descriptor (1210) are as follows:

Field (1211) is a 1 bit cascade field which indicates if another level of memory address translation is required for the memory transfer requests associated with this page descriptor.

Field (1212) encodes a 4 bit value that can encode 12 distinct page lengths. In this illustration the page lengths are: 4 kibibytes, 16 kibibytes, 32 kibibytes, 64 kibibytes, 128 kibibytes, 256 kibibytes, 512 kibibytes, 1 mebibyte, 2 mebibytes, 4 mebibytes, 8 mebibytes and 16 mebibytes.

Field (1213) encodes an 8 bit frame identifier.

Field (1214) encodes a 12 bit long displacement offset within the frame.

Field (1215) encodes a 3 bit permission field for user privileged software access. Those three bits encode "read for data", "write" and "read for execute" permissions respectively.

Field (1216) encodes a 2 bit permission field for system privileged software access.

Those 2 bits encode "read for any purpose" or "write" permissions respectively.

Field (1217) encodes a 2 bit permission field for the system privileged peripheral access. Those 2 bits encode "read for data" and "write" permissions respectively.

The 32-bit address field (1102) of the memory transfer request (1101) is logically partitioned into 2 fields:

The most significant 8 bits (1103) which encodes the page identifier;

The other 24 bits (1104) of the 32-bit address (1102) encodes the displacement within the page (1103). Those 24 bits (11014) are sub-divided into: the 12 most significant bits (1201) of the displacement within the page; and the 12 least significant bits (1202) of the displacement within the page.

The output of the page descriptor lookup module (1129 of FIG. 11 and 1129 of FIG. 12) is supplied as input to the memory transfer request re-assembly and permission check module (1170 of FIG. 11 and 1170 of FIG. 12). That module (1170 of FIG. 12) comprises a 12-bit wide combining operation module (1273) which:

Receives as input the 12 most significant bits (1201) of the displacement within the page (1103) of the memory transfer request (1101).

Receives as input the 12 bit long displacement offset with the frame (1214).

When the value of the passthrough signal (1131) is 1 then:
the 12 most significant bits (1201) of the displacement within the page (1103) of the memory transfer request (1101) is released as output (1286);

otherwise:
the 12 most significant bits (1201) of the displacement within the page (1103) of the memory transfer request (1101) is combined with the 12 bit long displacement offset within the frame (1214) and the result of that combination is released as output (1286). In preferred embodiments of the present invention a 12-bit wide arithmetic addition is employed as the combining function. Alternative combining functions include, but are not limited to: a 12-bit wide XOR; or a combining function that uses the value of the length field (1212) to determine which of the bits of field (1201) and which of the bits of (1214) to release as output.

The memory transfer request re-assembly and permission check module (1170) further comprises a permission checking module (1274) that:

Checks that the value of the 12 most significant bits (1201) of the displacement within the page (1103) of the memory transfer request (1101) is less than or equal to the page length (1212) of the page descriptor (1210) associated with that memory transfer request (1101).

Checks that the control field (1105) and privilege field (1106) of the memory transfer request (1101) is permitted by the permission policies encoded in the fields (1215, 1216, 1217) of the page descriptor (1210) associated with that memory transfer request (1101). If that permission check fails, a fault signal is thrown (1172).

In preferred embodiments of the present invention, the activation of either of the fault signals (1140) or (1172) results in an interrupt event being issued to a processor core (110).

The value of the translated memory transfer request (1280) is generated as follows: The value of the control field (1281) of the translated memory transfer request (1280) is set to the value of the control field (1105) of the input memory transfer request (1101). The value of the privilege field (1282) of the translated memory transfer request (1280) is set to the value of the privilege field (1106) of the input memory transfer request (1101). The value of the optional space selection field (1283) of the translated memory transfer request (1280) is set to the value of space selection field (1107) of the input memory transfer request (1101). The value of the 8-bit frame field (1284) of the address field (1284, 1285) of the translated memory transfer request (1205) is set to the value of the frame field (1103) of the input memory transfer request (1102) when the value of the passthrough signal (1131) is 1. Otherwise the value of the 8-bit frame field (1284) of the address field (1284, 1285) of the translated memory transfer request (1280) is set to the value of the frame identifier (1213) of the page descriptor (1210) associated with that memory transfer request (1101). The value of the most significant 12 bits of the 24-bit displacement field (1285) of the address field (1284, 1285) of the translated memory transfer request (1280) is set to the value of the output (1286) of the 12-bit wide combining operation module (1273). The value of the least significant 12 bits of the 24-bit displacement field (1285) of the address (1284, 1285) of the translated memory transfer request (1280) is set to the value of the least significant 12 both bits of the address field (1104) of the memory transfer request (1101).

FIG. 13 is a flow chart (1300) illustrating a memory address translation operation performed by the control unit (121 of FIG. 1) of the PMTRP unit (120 of FIG. 1) according to preferred embodiments of the present invention as described in FIG. 11 and FIG. 12.

The flow chart starts in step 1301.

In step (1302) a memory transfer request is received (1101) by the control unit (121) on target port (128).

In step (1303) the partition selection module (1130) processes the memory transfer request (1101) to determine which partition, if any, is associated with that memory transfer request. Permission checks are performed with regard to memory transfer requests addressed to system space (1122). Checks are also performed with regard to memory transfer requests addressed to the high user space (1124) and the availability of a partition mapped to that high user space (1124).

In step (1304) if a fault is generated during step (1303) then go to step (1308) else go to step (1305).

In step (1305), the partition selected in step (1303) is supplied as the partition index to the partitioned single-level direct indexed page descriptor lookup module (1150). The 6 bits (1111) of the 32-bit address field (1102) of the memory transfer request (11102) that sub-divide the divide each of the 4 spaces (1121, 1122, 1123, 1124 of FIG. 11) into 64 spaces is supplied as the page index to that partitioned page descriptor lookup module (1150). The page descriptor lookup module retrieves the value of the requested page descriptor and releases that value as output. The output of page descriptor lookup module is received as input by the reassembly and permission check module (1170).

In step (1306) the permission checking module (1274 of FIG. 12) performs consistency checks between the memory transfer address received in step (1302) and the page descriptor issued in step (1305).

In step (1307) if the consistency check performed in step (1306) fails then go to step (1308), otherwise go to step (1311).

In step (1308) generate a fault signal (on 1140 or 1172).

In step (1309) if the memory transfer request received in step (1302) is a write request go to step (1317), otherwise go to step (1310).

In step (1310) issue a read memory transfer response with the value zero in the data field. If the interconnect protocol offers the capability, return an error status (1041 of FIG. 10) for that memory transfer request. Go to step (1317).

In step (1311) perform the 12-bit wide merging operation (1273) and generate the fields of the translated memory transfer request (1280).

In step (1312) if the memory transfer request received in step (1202) is a write request go to step (1313), otherwise go to step (1314).

In step (1313) issue the write memory transfer request on master port (129) of the PMTRP unit (120). Go to step (1317).

In step (1314) issue the read memory transfer request on master port (129) of the PMTRP unit (120).

In step (1315) receive the corresponding read memory transfer response on master port (129) of the PMTRP unit (120).

In step (1316) on-forward the results of that read memory transfer response on the target port (128) of the PMTRP unit (120).

The flow-chart stops in step (1317).

In highly resource constrained embedded micro environments, there is a need to reduce the amount of hardware resources exclusively dedicated to the PMTRP unit (120 of FIG. 1). In particular, in resource constrained environments (such as the Internet of Things) that must run page based MMU schemes to support general purpose operating systems such as Linux, there is also a long felt need for an innovative MMU architecture that requires less hardware circuit area to implement than conventional page based MMU and that also supports faster execution of software after a user address space context swap. There is also a need to improve software performance after a task context switch for MMU schemes that employ translation look aside buffers. There is also a long felt need for a means to cost effectively accelerate the reprogramming of MMU region descriptors with lower latency in a time analysable way in realtime environments to support faster task swapping and improved system performance.

With reference to FIG. 12, an alternate preferred embodiment of the present invention makes the following modifications:

The two bit field (1216) and the two bit field (1217) are not employed. Software with system privilege is permitted to access all data. Peripherals are permitted to access to all data.

The field 1212 is modified to be 8-bits in length and can encode 256 bit distinct page lengths. The first set of 128 page lengths (with values 0 to 127) have 4 kibibyte granularity and map the range from 4 KB to 512 KB. The second set of 128 page lengths (with values 128 to 255) have 128 KB granularity and map the range from 128 KB to 16 mebibytes.

This alternate configuration provides improved granularity of memory allocation for the page descriptor (1210) while maintaining a descriptor length of 32-bits. Most applications in resource-constrained embedded micro applications today require less than 512 KB memory, and so can be efficiently mapped to physical memory with 4 KB granularity. When required, the granularity of the page-length (1212) and the granularity of the displacement offset (1214) can be increased easily by a person skilled in the art.

We will now describe a preferred embodiment of FIG. 1 in which the PMTPR unit (120) is adapted with means to cache access to at least two sets (which may be implemented as two tables) of at least two programmable region descriptors by generating and sending at least one memory transfer request over the master port (129) of the PMTRP unit (120) and receiving the corresponding responses on that master port (129). This specific adaptation permits cached region descriptors to be directly stored in the same memory store (170) that translated memory transfer requests may be addressed to. In particular, those cached region descriptor tables can be used to implement the second-level of a two-level translation look-aside buffer scheme, in which the first-level of cached TLB entries is stored in the programmable configuration data of the PMTRP unit. Decoupling the second level of TLB entries from the programmable configuration data of the PMTRP unit permits each user address space to have its own dedicated second-level translation look-aside buffer table stored in the relatively large and cheap main-memory, resulting in a higher second-level TLB hit rate after a context swap. For example, the first level of the TLB lookup can employ a fully associative lookup of cached TLB descriptors, and the second level of the TLB lookup can employ a single-level direct index lookup of cached TLB descriptors. In preferred embodiments of the present invention, each software application that has a distinct user address space has its own dedicated table of single-level direct index lookup of cached TLB descriptors.

FIG. 14 is a block diagram illustrating the partitioning of an address space (1400) for accessing programmable configuration data stored in the memory store (123) of the PMTRP unit (120) according to a preferred embodiment of the present invention. In FIG. 14, that memory address space (1400) is divided into 23 fields (1401 to 1423). Each of the 23 fields (1401 to 1423) is 32-bits in length. That address space (1400) is logically partitioned into:

a first contiguous set (1431) of 6 fields (1401 to 1406) associated with the configuration of the system part of the address space of the target port (128) of the PMTRP unit (120);

a second contiguous set (1432) of 6 fields (1407 to 1413) associated with the configuration of the user part of the address space of the target port (128) of the PMTRP unit (120); and a third contiguous set (1433) of 10 fields (1414 to 1423) associated with the configuration of a cache that caches information associated with either the system or user part of the address space of the target port (128) of the PMTRP unit (120).

The first contiguous set (1431) of fields comprises:

16-bit long field (1401.a) which encodes the configuration metadata associated with a first system region descriptor table. The base address offset of the first system region descriptor table is stored in the 32-bit long field (1402).

16-bit long field (1401.b) which encodes the configuration metadata associated with a second system region descriptor table. The base address offset of the second system region descriptor table is stored in the 32-bit long field (1403).

Field (1404 and 1405) which encodes a second level of address translation for the system region. Specifically the field (1404) encodes the maximum length of the system address space within the first level of the translated address space and field (1405) encodes a displacement offset of the system address space within the second level of the translated address space.

The PMTRP unit (120) is adapted such that writing any value to fields (1401, 1402, 1403, 1404, 1405) notifies the PMTRP control unit (121) that the configuration data for the system portion of the address space is currently being re-programmed. The PMTRP unit (120) is adapted such that writing any value to field (1406) notifies the PMTRP control unit (121) that the configuration data for the system portion of the address space has finished being re-programmed.

The second contiguous set (1431) of fields comprises:

16-bit long field (1407.a) which encodes the configuration metadata associated with a first user region descriptor table. The base address offset of the first user region descriptor table is stored in the 32-bit long field (1408).

16-bit long field (1407.b) which encodes the configuration metadata associated with a second user region descriptor table. The base address offset of the second user region descriptor table is stored in the 32-bit long field (1409).

Field (1410) is used to assist the executive system calculate the hash transformation for associating a region of the input address space with a region descriptor encoded in a hash-indexed one-level descriptor table. The value to hash is written into the field (1410). The hashed value is then read from the field (1410).

Fields (1411) and (1412) which encodes a second level of address translation for the user region. Specifically the field (1411) encodes the maximum length of the user address space within the first level of the translated address space and field (1412) encodes a displacement offset of the user address space within the second level of the translated address space.

The PMTRP unit (120) is adapted such that writing any value to fields (1407, 1408, 1409, 1410, 1411, 1412) notifies the PMTRP control unit (121) that the configuration data for the user portion of the address space is currently being re-programmed. The PMTRP unit (120) is adapted such that writing any value to field (1413) notifies the PMTRP control unit (121) that the configuration data for the user portion of the address space has finished being re-programmed.

The third contiguous set (1431) of fields comprises:

A first 128-bit long cache line ({1415 to 1418}).

A second 128-bit long cache line ({1419 to 1422}).

Field (1414) which encodes the tag data for the first cache line ({1415 to 1418}) and the second cache line ({1419 to 1422}).

The PMTRP unit (120) is adapted such that writing any value to fields (1414, 1415, 1416, 1417, 1418, 1419, 1420, 1421, 1422) notifies the PMTRP control unit (121) that the configuration data for the cache is currently being re-programmed. The PMTRP unit is adapted such that writing any value to field (1413) notifies the PMTRP control unit (121) that the configuration data for the cache has finished being re-programmed.

In a preferred embodiment of the present invention, the cache fields (1433) of the programmable configuration data of the PMTRP unit (120) are adapted to implement a translation look aside buffer for region descriptors in which:

the first 128-bit long cache line ({1415 to 1418}) is adapted to store a first 128-bit long region descriptor; and the second 128-bit long cache line ({1419 to 1422}) is adapted to store a first 128-bit long region descriptor.

In preferred embodiments of the present invention, the two 128-bit long region descriptors are used to cache region descriptors associated with the user space or the system space.

FIG. 15 is a block diagram illustrating a 16-bit wide configuration metadata field (1510) employed in FIG. 14 according to a preferred embodiment of the present invention. That configuration metadata field (1510) is employed in the fields (1401.*a*, 1402.*b*, 1407.*a*, 1407.*b*) of the programmable configuration data stored in the memory store (123) of the PMTRP unit (120). The fields of the 16-bit configuration metadata field (1510) comprise:

A 1 bit long field (1511) indicating if the region descriptor table associated with this configuration metadata field is enabled.

A 1 bit long field (1512) indicating if a linear direct-mapped or non-linear direct mapped indexing scheme is employed to access a region descriptor in that table of region descriptors.

A 3 bit long field (1513) encoding the number of region descriptors in the table. In preferred embodiments of the present invention, the number of region descriptors can be selected from one of the following 8 table lengths: 8, 16, 32, 64, 128, 256, 512 and 1024 region descriptors.

A 3 bit long field (1514) indicating the encoding format of the region descriptors. 5 example encoding formats include:
A table of 32-bit long page descriptors.
A table of 64-bit long segment descriptors.
A table of 64-bit long cached paged descriptors.
A table of 128-bit long cached segment descriptors.
A table of 32-bit long table descriptors that point to tables of descriptors.

A 6 bit long field (1515) indicating the maximum page length or the maximum segment length as most appropriate for the type of descriptor. In a preferred embodiment of the present invention, the 6-bit binary value 000000 encodes the decimal value 1, and the 6-bit value 111111 encodes the decimal value 64. The value of the maximum length field is calculated as the value 2 exponentially raised (A) to the power of the value of decimal value of that 6-bit field. So if the decimal value of that 6-bit long field is 32, the maximum length is calculated as (2^32)=4 gibibytes.

A 1 bit long field (1516) indicating if an additional length check is employed after the first address translation operation is completed.

A 1 bit long field (1517) indicating if a second address translation is employed after the first address translation operation is completed.

FIG. 16 is a block diagram illustrating a region descriptor (1600) employed in FIG. 14 according to a preferred embodiment of the present invention.

When the region descriptor (1600) is configured as a 32-bit long page descriptor, the fields of FIG. 16 are employed as follows: A 1 bit long field (1611) indicating if this region descriptor is enabled. A 1 bit long field (1612) indicating if peripherals are simultaneously permitted "read for data" and "write" access the region of memory associated with this region descriptor. A 1 bit long field (1613) indicating if supervisor software is simultaneously permitted "read for data", "write" and "read for execute" access the region of memory associated with this region descriptor. A 3 bit long field (1614) encoding "read for data", "write" and "read for execute" permissions for user software respectively. A 26 bit long field (1615) encoding the frame identifier for this page. The fields (1621, 1622, 1623, 1624, 1625, 1631, 1635, 1640) are not employed.

When the region descriptor (1600) is configured as a 64-bit long segment descriptor, the fields of FIG. 16 are employed as follows: A 1 bit long field (1611) indicating if this region descriptor is enabled. A 1 bit long field (1612) indicating if peripherals are simultaneously permitted "read for data" and "write" access the region of memory associated with this region descriptor. A 1 bit long field (1613) indicating if supervisor software is simultaneously permitted "read for data", "write" and "read for execute" access the region of memory associated with this region descriptor. A 3 bit long field (1614) encoding "read for data", "write" and "read for execute" permissions for user software respectively. A 26 bit long field (1615) encoding the displacement within the translated address space for this region with 64 byte granularity. A 26 bit long field (1625) encoding the length of the allocated portion of this segment with 64 byte granularity. The fields (1621, 1622, 1623, 1624) are reserved for future use. The fields (1625, 1631, 1635, 1640) are not employed.

When the region descriptor (1600) is configured as a 64-bit long cached page descriptor, the fields of FIG. 16 are employed as follows: A 1 bit long field (1611) indicating if this region descriptor is enabled. A 1 bit long field (1612) indicating if peripherals are simultaneously permitted "read for data" and "write" access the region of memory associated with this region descriptor. A 1 bit long field (1613) indicating if supervisor software is simultaneously permitted "read for data", "write" and "read for execute" access the region of memory associated with this region descriptor. A 3 bit long field (1614) encoding "read for data", "write" and "read for execute" permissions for user software respectively. A 26 bit long field (1615) encoding the displacement within the translated address space for this region with 64 byte granularity. A 26-bit long field (1625) encoding the page identifier of this region descriptor with 64 byte granularity. A 1-bit long field (1621) encoding a data-written (dirty) flag for this cached region descriptor. A 1-bit long field (1622) encoding a data-read flag for this cached region descriptor. A 1-bit long field (1263) encoding the cache-policy to be used for memory transfer requests addressed to a memory location within the region associated with this region descriptor. The field (1624) is reserved for future use. The fields (1625, 1631, 1635, 1640) are not employed.

When the region descriptor (1600) is configured as a 128-bit long cached segment descriptor, the fields of FIG. 16 are employed as follows: A 1 bit long field (1611) indicating if this region descriptor is enabled. A 1 bit long field (1612) indicating if peripherals are simultaneously permitted "read for data" and "write" access the region of memory associated with this region descriptor. A 1 bit long field (1613) indicating if supervisor software is simultaneously permitted "read for data", "write" and "read for execute" access the region of memory associated with this region descriptor. A 3 bit long field (1614) encoding "read for data", "write" and "read for execute" permissions for user software respectively. A 26 bit long field (1615) encoding the displacement within the translated address space for this region with 64 byte granularity. A 1-bit long field (1621) encoding a data-written (dirty) flag for this cached region descriptor. A 1-bit long field (1622) encoding a data-read flag for this cached region descriptor. A 1-bit long field (1263) encoding the cache-policy to be used for memory transfer requests addressed to a memory location within the region associated with this region descriptor. The field (1624) is reserved for future use. A 26-bit long field (1625) encoding the segment identifier of this region descriptor with 64 byte granularity. A 26-bit long field (1635) encoding the length of the allocated portion of this segment with 64 byte granularity. The fields (1631, 1640) are reserved for future use.

When the region descriptor (1600) is configured as a 32-bit long table descriptor, the fields of FIG. 16 are employed as follows: A 1 bit long field (1611) indicating if this region descriptor is enabled. A 26 bit long field (1615) encoding an address (in the translated address space) of a table of region descriptors. The fields (1612, 1613, 1614) are reserved for future use.

In preferred embodiments of the present invention, N-bit long region descriptors are N-bit aligned in memory.

FIG. 17 is a hybrid block schematic diagram and data flow diagram partially illustrating an apparatus (1700) according to a preferred embodiment of the present invention as described with reference to FIGS. 1, 14, 15 and 16. Processor core (110) and its master port (111) of FIG. 17 are described in the text describing FIG. 1. The PMTRP unit (120) and its associated labels (121, 123, 128, 129, 130, 131, 134, 130) of FIG. 17 are described in the text describing FIG. 1. The apparatus (1700) further comprises: an IRQ target port (1711) on the core (110); and an IRQ master port (1728) on the PMTRP unit (120) which is connected to the IRQ target port (1711).

The programmable configuration data stored in the memory store (123) of the PMTRP unit (120) is adapted according to the text describing FIG. 14.

Label (1710) illustrates an input address space equally partitioned into a system space (1711) and a user space (1712). Label (1720) illustrates a translated address space. Memory transfer requests issued over master port (129) of the PMTRP unit are addressed to that translated address space (1720).

Label (1402 of FIG. 17) illustrates that the base address offset of the first system region descriptor table field (1402 of FIG. 14) is associated with a system region descriptor table (1421) that stores 8 region descriptors. The system space (1711) of the input address space (1710) of port (128) is associated with the first system region descriptor table (1421) that is stored in the translated address space (1720).

Label (1408 of FIG. 17) illustrates that the base address offset of the first user region descriptor table field (1408 of FIG. 14) is associated with a user region descriptor table (1422) that stores 8 region descriptors. The user space (1712) of the input address space (1710) of port (128) is associated with the first user region descriptor table (1422) that is stored in the translated address space (1720).

Label ({1415 to 1418} of FIG. 17) illustrates that one of the region-descriptors of the user region descriptor table (1423) is cached in the first 128-bit long cache line ({1415 to 1418}) of FIG. 14. In this embodiment, the region descriptor table (1423) stores 16 region descriptors. The user space (1712) is associated with the user region descriptor table (1423) that is stored in the translated address space (1720).

The region (1725) is associated with the region descriptor cached in the first 128-bit long cache line ({1415 to 1418}). The user space (1712) is associated with the region (1725) that is stored in the translated address space (1720).

In a preferred embodiment of the present invention, the system region descriptor table (1421) is configured in one of the 2 following schemes:
  A single-level direct mapped index segment table scheme;
  A single-level direct mapped index cached page table scheme that stores the region descriptors for the second level of a two-level TLB scheme.

In a preferred embodiment of the present invention: the region descriptor table (1422) encodes the first level of a two-level direct mapped index table scheme; and the region descriptor table (1423) encodes the second level of a two-level direct mapped index table scheme.

In a preferred embodiment of the present invention, the region descriptor for the first level of a two-level direct mapped index table scheme and the region descriptor for the second level of a two-level direct mapped index table scheme are sequentially loaded into the same cache line ({1415 to 1418}) during a two-level table lookup operation.

In a further preferred embodiment of the present invention, the control unit (121 of FIG. 17) of the PMTRP unit (120 of FIG. 17) is adapted with an additional bus master interface (1729). The PMTRP unit (121 of FIG. 17) is further adapted with means to issue two concurrent accesses to the translated address space (1720) to read two region descriptor elements stored in 2 different memory stores concurrently.

FIG. 18 is a flow chart (1800) illustrating a memory address translation operation performed by the control unit (121 of FIG. 17) of the PMTRP unit (121 of FIG. 17) according to FIGS. 14, 15, 16 and 17. In this pedagogical flow-chart, the PMTRP unit is adapted only to query single-level direct-mapped region descriptor tables.

The flow chart starts in step (1801).

In step (1802) a memory transfer request is received by the control unit (121 of FIG. 17) of the PMTP unit (120) on target port (128).

In step (1803) the contents of the cache tag data field (1414 of FIG. 14) and the contents of the two 128-bit cache-lines fields ({1415 to 1418}) and ({1419 to 1422}) are queried to determine which, if any, of the two 128-bit cache-lines is associated with this memory transfer request.

In step (1804) if none of the cache-lines are associated with this memory transfer request, go to step (1805) otherwise go to step (1809).

In step (1805) the content of the configuration metadata associated with: a first system region descriptor table (1401.a) of FIG. 14; a second system region descriptor table (1401.b); a first user region descriptor table (1407.a); and a second user region descriptor table (1407.b) are queried to determine the base address offset (1402, 1403, 1408, 1409) of the table of region descriptors related to this memory transfer request.

In step (1806) a burst read memory transfer request is issued to retrieve the region descriptor associated with this memory transfer request from the region descriptor table selected in step (1805). The length of the burst memory transfer request is determined in relation to the type of region descriptor indicated by the region descriptor encoding scheme field (1515 of FIG. 15) of the configuration metadata associated with this memory transfer request.

In step (1807) the value of the selected region descriptor element is loaded into the least recently used cache-line of the two 128-bit cache-lines ({1415 to 1418}) and ({1419 to 1422}).

In step (1808) the value of the region descriptor element received in (1807) is inspected.

In step (1809) if the region descriptor element is not enabled then go to step (1813). If the region descriptor is a cached region descriptor that is not related to the address of the memory transfer request in step (1802) then go to step (1813). Go to step (1810).

In step (1810) the region descriptor stored in the cache-line associated with the memory transfer request received by the control unit on port (128) in step (1802) is received by the reassembly and permission check module of that PMTRP unit.

In step (1811) the permission checking module performs consistency checks between the memory transfer address received in step and the segment descriptor received in step (1810).

In step (1812) if the consistency check fails then go to step (1813) otherwise go to step (1816).

In step (1813) generate a fault notification event by throwing an interrupt on the port (1728) of the PMTRP unit (120) of FIG. 17.

In step (1814) if the memory transfer request received in step (1802) is a write request then go to step (1815) otherwise go to step (1820).

In step (1815) issue a read memory transfer response with the value zero in the data field (1043). If the interconnect protocol offers an error reporting capability then return an error status (1041) for that memory transfer request. Go to step (1822).

In step (1814) perform the memory address translation and generate the fields of the translated memory transfer request.

In step (1817) if the memory transfer request received in step (1802) is a write request then go to step (1818) otherwise go to step (1819).

In step (1818) issue the write memory transfer request on the master port (1818) of the PMTRP unit. Go to step (1822).

In step (1819) issue the read memory transfer request on the master port (129) of the PMTRP unit.

In step (1820) receive the corresponding read memory transfer response on the master port (129).

In step (1821) on-forward the results of that read memory transfer response on the target port (128).

The flow-chart stops in step (1822).

In a preferred embodiment of the present invention, the steps (1805), (1806), (1808) and (1809) are further adapted to retrieve and evaluate two region descriptors. For example searching the region descriptors stored in a two-way set associative table of cached region descriptors. This adaptation can be easily performed by a person skilled in the art of implementing set associative cache schemes.

In a preferred embodiment of the present invention, the steps (1805), (1806), (1808) and (1809) are further adapted to perform a two-level region descriptor walk. This adaptation can be easily performed by a person skilled in the art of implementing two-level MMU schemes.

There is a long-felt need for an MMU architecture that has low-latency, high-throughput, constant time operation with support for relatively fine-grain memory allocation in 32-bit and 64-bit input address spaces. In the microcontroller market, there is also a need to provide a PMTRP unit that can operate as a memory protection unit (MPU) and also operate as a MMU to run commercial high-assurance security-critical real-time operating systems (RTOS). This is because many high-assurance RTOS rely on the availability of a hardware MMU with address translation capabilities. There is also a long-felt need for a means to cost effectively accelerate the re-programming of region descriptors with lower-latency in a time-analysable way in real-time environments to support faster task-swapping and improved system performance.

FIG. 19 is a block diagram illustrating various fields that may be present in a range descriptor (1910) that has been adapted with a programmable memory address translation policy according to a preferred embodiment of the present invention. The lower-bound address and upper-bound address of the range is stored in the fields (1914) and (1918) respectively. Field (1911) encodes a 1 bit "read for data" permission field for user privileged software access. Field (1912) encodes a 1 bit "write" permission field for user privileged software access. Field (1913) encodes a 1 bit "read for execute" permission field for user privileged software access. Field (1914) encodes a 29 bit lower-bound address of the contiguous region of the input address space associated with this range descriptor. Field (1915) encodes a 1 bit "read for data" permission field for user privileged software access. Field (1916) encodes a 1 bit "write" permission field for user privileged software access. Field (1917) encodes a 1 bit "read for execute" permission field for user privileged software access. Field (1918) encodes a 29 bit upper-bound address of the contiguous region of the input address space associated with this range descriptor. The length of this region is calculated by: subtracting the value of the lower-bound address (1914) from the value of the upper-bound address (1918) and then adding the value 1. Field (1920) encodes a 1 bit value indicating if this range descriptor is enabled. Field (1921) encodes a 1 bit value indicating if memory address translation is enabled for this range descriptor. Field (1922) encodes a signed 30-bit value used to translate an address in the input address space to an address in the translated address space. The most significant bit (1923) encodes the sign (+/−) of the remaining 29 bits (1924).

FIG. 20 is a block diagram (2000) illustrating the fields of a memory transfer request (2001) according to a preferred embodiment of the present invention. The memory transfer request (2001) comprises the fields (2005 to 2013). Field (2005) encodes a 3 bit (2006, 2007, 2008) control field of the memory transfer request (2001). Field (2006) encodes a 1 bit "read for data" permission field for user privileged software access. Field (2007) encodes a 1 bit "write" permission field for user privileged software access. Field (2008) encodes a 1 bit "read for execute" permission field for user privileged software access. Field (2009) encodes a 2 bit (2010, 2011) privilege value indicating either user-level privilege (2010) or system-level privilege (2011) for that memory transfer request (2001). Field (2012) encodes a 32-bit address in the input address space associated with that memory transfer request (2001). Field (2013) is mapped to the 29 most significant bits of that 32-bit address (2012).

FIG. 21 is a hybrid block schematic diagram and data flow diagram partially illustrating a preferred embodiment (2100) of the present invention in which the PMTRP unit (120) of FIG. 1 is adapted to employ two memory management units (2101, 2140). The programmable configuration data stored in the memory store (123) is described in the text describing FIG. 1. The target port (134) is adapted to receive a memory transfer request to access a portion of the region descriptor elements stored within the memory store (123) of FIG. 21 is described in the text describing FIG. 1. Label (2001) of FIG. 21 is the memory transfer request (2001) of FIG. 20. The first MMU (2101) employs 8 range descriptors (2111 to 2118) that have been adapted with a programmable memory address translation policy as illustrated by the range descriptor (1910) of FIG. 19. In this embodiment, the 8 range descriptors (2111 to 2118) are evaluated in parallel for every memory transfer request.

The range descriptor comparator module (2121) receives as input the memory transfer request (2001) and the value of the range descriptor (2111) and generates output that is received as input to the comparator aggregator module (2130). The range descriptor comparator module (2123) receives as input the memory transfer request (2001) and the value of the range descriptor (2113) and generates output that is received as input to the comparator aggregator module (2130). The range descriptor comparator module (2124) receives as input the memory transfer request (2001) and the value of the range descriptor (2114) and generates output that is received as input to the comparator aggregator module (2130). The range descriptor comparator module (2125) receives as input the memory transfer request (2001) and the value of the range descriptor (2115) and generates output that is received as input to the comparator aggregator module (2130). The range descriptor comparator module (2126) receives as input the memory transfer request (2001) and the value of the range descriptor (2116) and generates output that is received as input to the comparator aggregator module (2130). The range descriptor comparator module (2127) receives as input the memory transfer request (2001) and the value of the range descriptor (2117) and generates output that is received as input to the comparator aggregator module (2130). The range descriptor comparator module (2128) receives as input the memory transfer request (2001) and the value of the range descriptor (2118) and generates output that is received as input to the comparator aggregator module (2130). The functionality of the range descriptors (2111 to 2118) is described in FIG. 22.

The second memory management unit (2140) is a PMTRP unit that is adapted to employ a 32-bit page based MMU scheme with at least two levels of translation tables.

The comparator result aggregator module (2130) is adapted to:
  Generate a cascade flag output (2134) which is supplied as input to the second MMU (2140) that indicates if the address (2012) of the memory transfer request (2001) should be translated by that second MMU (2140).
  Generate a cascade flag output (2132) which is supplied as the select input to the 2 input 1 output multiplexer (2150).
  Generate a translated memory transfer request as output (2133) which is supplied as the first data input to the 2 input 1 output multiplexer (2150).
  Generate a transaction fault as output (2131) which is supplied as input to a fault aggregation unit (2160) that aggregates fault events.

The second memory management unit (2140) is adapted to:
  Generate a translated memory transfer request as output (2141) which is supplied as the second data input to the 2 input 1 output multiplexer (2150).
  Generate a transaction fault as output (2142) which is supplied as input to a fault aggregation unit (2160) that aggregates fault events.

The fault aggregation unit (2160) issues a fault event as output (2161) when a fault is issued (2131) by the first MMU (2101) or when a fault is issued (2142) by the second MMU (2140).

The 2 input 1 output multiplexer (2150) generates as output (2151) a translated memory transfer request. When the fault aggregation unit does not issue a fault event (2161), that translated memory transfer request (2151) is issued as output over the master port (129) of the PMTRP unit (120).

FIG. 22 is a hybrid block schematic diagram and data flow diagram partially illustrating a range descriptor comparator module (2200) according to a preferred embodiment of the present invention. The labels (1911, 1192, 1193, 1914, 1915, 1916, 1917, 1918, 1921, 1923, 1920 and 1924) of FIG. 22 are described in the text describing the range descriptor (1910) in FIG. 19. The labels (2006, 2007, 2008 and 2013) are described in the text describing the memory transfer request (2001) in FIG. 20. Comparator module (2220) comprises the following sub-modules:
  The greater than or equal to comparator module (2210) receives the value of the upper 29 bits (2013) of the 32-bit address (2012) of the memory transfer request (2001) and compares it against the value of the 29-bit lower-bound address (1914) of the contiguous region of the input address space and generates the single bit value 1 as output if the value of the address (2012) is larger than or equal to the value of the lower-bound address (2013) of the contiguous region of the input address space. Otherwise the comparator module (2210) generates the single bit value 0 as output. That single bit value is supplied as the first input to a 3 input 1 output AND module (2122).
  The less than or equal to comparator module (2211) compares the value of the upper 29 bits (2013) of the 32-bit address (2012) of the memory transfer request (2001) and compares it against the value of the 29-bit upper-bound address (1918) of the contiguous region of the input address space and generates the single bit value 1 as output if the value of the address (2012) is less than or equal to the value of the lower-bound address (2013) of the contiguous region of the input address space. Otherwise the comparator module (2211) generates the single bit value 0 as output. That single bit value is supplied as the second input to a 3 input 1 output AND module (2122).
  The value of the range descriptor enable flag (1920) is supplied as the third input to the 3 input 1 output AND module (2122). If each of the three data inputs of the 3 input 1 output AND module (2212) are the single bit value 1, then the output of the AND module (2212) is the single bit value 1. Else the output of the AND module (2212) is the single bit value 0.
  The output of that AND module (2212) is supplied as the value for the range descriptor active field (2236) of the output (2240). This field (2236) indicates if this memory transfer request (2001) is associated with this range descriptor (1910).
  The address translation module (2213) performs a signed arithmetic addition of the value of the unsigned upper 29 bits (2013) of the 32-bit address (2012) of the memory transfer request (2001) and the value of the signed 30-bit value (1922) that is used to translate an address in the input address space to an address in the translated address space.

The 2 input 1 output 29-bit wide multiplexer (2216) receives as its second data input the output of the signed arithmetic operation. Multiplexer (2216) receives as its first data input the constant 29-bit long value of zero (i.e. all of the 29-bits are set to the constant single bit value 0).

The module 2215 receives as input the output of the 2 input 1 output AND module (2122) which indicates if this memory transfer request is associated with this range descriptor. If the value of the translation enable field (1921) of that range descriptor is enabled and the output of module (2122) is the single bit value 1, then the output of module (2215) is the single bit value 1, else the output of that module (2215) is the single bit value 0.

The output of module (2215) is supplied as the value for the translation active field (2237) of the output (2240).

The output of module (2215) is supplied as the select input to the 2 input 1 output 29-bit wide multiplexer (2216). If the value of the select input is the single bit value 1, the value of the first data input to the multiplexer (2216) that contains the translated address is released as the output of the multiplexer (2216). Otherwise the value of the second data input to the multiplexer (2216) that contains the constant value zero is released as the output of the multiplexer (2216).

The permission check module (2220) receives as input the value of the user "read for data" permission field (1911), the value of the "read for data" field (2006) of the memory transfer request, the value of the privilege level (2009) of the memory transfer request (2001) and the output of module (2212) which indicates if this memory transfer request is associated with this range descriptor. The permission check module (2220) evaluates its inputs and releases the single bit value 1 if the permission check fails, other it releases the single bit value 0.

The permission check module (2221) receives as input the value of the user "write" permission field (1912), the value of the "write" field (2007) of the memory transfer request, the value of the privilege level (2009) of the memory transfer request (2001) and the output of module (2212) which indicates if this memory transfer request is associated with this range descriptor. The permission check module (2221) evaluates its inputs and releases the single bit value 1 if the permission check fails, other it releases the single bit value 0.

The permission check module (2222) receives as input the value of the user "read for execute" permission field (1913), the value of the "read for execute" field (2008) of the memory transfer request, the value of the privilege level (2009) of the memory transfer request (2001) and the output of module (2212) which indicates if this memory transfer request is associated with this range descriptor. The permission check module (2222) evaluates its inputs and releases the single bit value 1 if the permission check fails, other it releases the single bit value 0.

The permission check module (2223) receives as input the value of the "read for execute" field (2006) of the memory transfer request, the value of the privilege level (2009) of the memory transfer request (2001) and the output of module (2212) which indicates if this memory transfer request is associated with this range descriptor. The permission check module (2223) evaluates its inputs and releases the single bit value 1 if the permission check fails, other it releases the single bit value 0.

The permission check module (2224) receives the value of the system "write" permission field (1916), the value of the "write" field (2007) of the memory transfer request, the value of the privilege level (2009) of the memory transfer request (2001) and the output of module (2212) which indicates if this memory transfer request is associated with this range descriptor. The permission check module (2224) evaluates its inputs and releases the single bit value 1 if the permission check fails, other it releases the single bit value 0.

The permission check module (2225) receives as input the value of the system "read for execute" permission field (1917), the value of the "read for execute" field (2008) of the memory transfer request, the value of the privilege level (2009) of the memory transfer request (2001) and the output of module (2212) which indicates if this memory transfer request is associated with this range descriptor. The permission check module (2225) evaluates its inputs and releases the single bit value 1 if the permission check fails, other it releases the single bit value 0.

The outputs of permission check modules (2220 to 2225) are supplied as input to the fault aggregation unit (2226). The fault aggregation unit (2226) releases a single bit value of 1 if any of its inputs are the single bit value 1. Otherwise the fault aggregation unit (2226) releases a single bit value of 0. The output of aggregation unit (2226) is supplied as the value for the permission check fault field (2230) of the output (2240).

FIG. 23 is a hybrid block schematic diagram partially illustrating (2300) a comparator result aggregator module (2130 of FIG. 21) according to a preferred embodiment of the present invention. The 2 bit (2010, 2010 of FIG. 19) privilege level field (2009 of FIG. 23) is described in the text describing FIG. 19. The 1 bit cascade flag (2134 of FIG. 23) is described in the text describing FIG. 21. The 1 bit transaction fault flag (2131 of FIG. 23) is described in the text describing FIG. 21.

Label (2310) illustrates the eight translation active fields (2237) released concurrently as output by the 8 comparator modules (2121 to 2128).

Label (2320) illustrates the eight permission check fault fields (2230) released concurrently as output by the 8 range descriptor comparator modules (2121 to 2128).

Label (2301) illustrates a single bit "translation enable" configuration field that enables address translation for that MMU (2101).

Cascade module (2312) receives as inputs the eight (2310) translation active fields (2237) and the single bit translation enable configuration field (2301). The single bit value of the output of the cascade module (2312) is 1 if the value of the translation enable configuration field (2301) is 1 and none of the eight (2310) translation active fields (2237) has the value 1. Otherwise, the output of the cascade module is the value 0. The output of the cascade module (2312) is employed as the value of the single bit cascade flag (2134).

Transaction fault module (2311) receives as inputs the eight (2310) translation active fields (2237) and the single bit translation enable configuration field (2301). The single bit value of the output of the transaction fault module (2311) is 1 when the value of the translation enable configuration field (2301) is 1 AND more than one of the eight (2310) translation active fields (2237) has the value 1. The single bit value of the output of the transaction fault module (2311) is also 1 when the value of the translation enable configuration filed (2301) is 0 AND any of the eight translation active fields (2237) has the value 1. Otherwise the single bit value of the output of the transaction fault module (2311) is the value 0.

The permission check fault module (2322) receives as inputs the eight (2320) permission check fault fields (2230) issued by the 8 range descriptor comparator modules (2121 to 2128). The single bit value of the output of the permission check fault module (2322) is set to the value 1 if any one of the eight (2320) user permission check fault fields (2320) is the value 1. Otherwise the single bit value of the output of the permission check fault module (2322) is set to the value 0.

The fault aggregation module (2360) receives as inputs the output of modules (2311) and (2322). The fault aggregation module (2360) generates a single bit output of the value 1 if the value of any of its single bit inputs are the value 1. Otherwise the fault aggregation module (2360) generates a single bit output of the value 0. The output of the fault aggregation module (2360) is supplied as the value of the transaction fault flag (2131).

FIG. 24 is a block diagram (600) illustrating an example mapping of an input address space (2401) to a translated address space (2402) using two MMU means (2101 and 2140 of FIG. 21) according to a preferred embodiment of the present invention. Label (2400) illustrates 8 range descriptors (2111 to 2118). The range descriptor enable flag (1920) of range descriptor (2111) is illustrated as being disabled. The range descriptor enable flag (1920) of each of the range descriptors (2112 to 2118) is illustrated as being enabled. The translation enabled flag (1921) is disabled for region descriptors (2111, 2112, 2117) and enabled for region descriptors (2113, 2114, 2115, 2116, 2118). Range descriptor (2112) is configured to enable write permissions without address translation. Range descriptor (2117) is configured to enable read permissions without address translation. Range descriptors (2113, 2114, 2115, 2116, 2118) are illustrated as mapping ranges of the input address space to ranges in the target address space ({2113, 2433}, {2114, 2434}, {2115, 2435}, {2116, 2436}, {2118, 2438}). A write memory transfer request addressed to a memory address associated with the region descriptor (2112) is performed with an address translation (2435) that is the identity transformation.

A memory transfer request that is addressed to any one of the memory regions (2410, 2411, 2412, 2413, 2414, 2415, 2416) that is not associated with any one of the region descriptors (2111 to 2118) of the first MMU (2101) is on-forwarded to the second MMU (2140) for additional processing. For example, region (2420) in the input address space is associated with one or more region descriptors in the second MMU (2140). That region (2420) is translated (2421) to the memory range (2422) in the target address space by that second MMU (2140).

In a preferred embodiment of the present invention, an apparatus comprises:
a programmable memory transfer request processing (PMTRP) unit, comprising:
a first port, which is a target port, adapted to:
receive a memory transfer request associated with a first address space; and
send a corresponding memory transfer response;
programmable configuration data, in which the programmable configuration data comprises:
at least one region descriptor that encodes at least one policy that is associated with a region of the first address space, in which:
for each of the at least one region descriptors, the type of that region descriptor is selected from one of the 7 following types:
a page descriptor with a fixed length page;
a page descriptor with a variable length page;
a segment descriptor;
a translation look aside buffer descriptor;
a range descriptor;
a range descriptor that has been adapted with a programmable memory address translation policy;
a cache tag descriptor;
a second port, which is a master port, adapted to:
send a memory transfer request associated with a second address space;
and
receive a corresponding memory transfer response;
means to process a memory transfer request associated with the first address space received on the first port in accordance with the at least one policy associated with the first address space encoded in the programmable configuration data at the time of processing;
means to generate and send on the second port a memory transfer request associated with the second address space in response to a memory transfer request associated with the first address space received on the first port in accordance with the at least one policy associated with the first address space encoded in the programmable configuration data at the time of processing;
a third port, which is a target port, adapted to:
receive a memory transfer request associated with a third address space for accessing a portion of the programmable configuration data; and
send a corresponding memory transfer response;
means to process a well-formed memory transfer request received on the third port that is addressed to a memory location in the third address space that is associated with a portion of at least one of the at least one region descriptor;
a programmable direct memory access (PDMA) unit comprising:
a first port, which is a target port, adapted to:
receive a memory transfer request to control the PDMA unit; and
send a corresponding memory transfer response;
a second port, which is a master port, adapted to:
send a memory transfer request; and
receive a corresponding memory transfer response;
programmable configuration data, including:
at least one memory-to-memory transfer control descriptor that can describe a memory-to-memory transfer operation; and
means to process a memory-to-memory transfer operation using the second port and at least one memory-to-memory transfer control descriptor; and
in which:
the PDMA unit is adapted to send a memory transfer request from its second port to the third port of the PMTRP unit; and
the PMTRP unit is adapted to receive and successfully process a well-formed memory transfer request issued over the second port of the PDMA unit that is addressed to a memory location in the third address space that is associated with a portion of at least one of the at least one region descriptor of the PMTRP unit.

In a further preferred embodiment of the present invention:
- a portion of the programmable configuration data is associated with the user portion of the first address space; and
- all of the programmable configuration data of the PMTRP unit associated with the user portion of the first address space that is accessible over the third port of the PMTRP unit can be programmed in one memory-to-memory transfer operation of the PDMA unit.

In a preferred embodiment of the present invention, an apparatus that is adapted to map a memory transfer request associated with a first address space with one of at least N+1 logically independent memory transfer request processing regions, said first address space being partitioned into at least N contiguous partitions, said apparatus comprising:
- a first port, which is a target port, adapted to:
  - receive a memory transfer request associated with a first address space, in which the memory transfer request is associated with:
    - a memory address in the first address space; and
    - an address space identifier; and
  - send a corresponding memory transfer response;
- a second port adapted to send a value associated with one of the at least N+1 logically independent MTRP regions;
- means to generate a value associated with one of the at least N+1 logically independent MTRP regions on the second port in response to a memory transfer request received on the first port;
- means to indicate if a memory transfer request was not successfully mapped to one of the at least N+1 logically independent MTRP regions on the third port;

in which:
- the value of N is at least 2;
- at least 2 of the at least N+1 logically independent MTRP regions can be mapped to the same partition of at least N contiguous partitions of the first address space; and
- if the memory address associated with a memory transfer request received on the first port is associated with one of the at least N contiguous partitions of the first address space that can have at least 2 of the at least N+1 logically independent MTRP regions mapped to it then the value of the address space identifier associated with that memory transfer request is used to distinguish which, if any, of those at least 2 of the at least N+1 logically independent PMTRP regions it maps to.

In a further preferred embodiment of the present invention, each of the at least N+1 logically independent memory transfer request processing (MTRP) regions employs a programmable memory address translation scheme for translating memory transfer requests addressed to that region.

In a preferred embodiment of the present invention, an apparatus comprises a programmable memory transfer request processing (PMTRP) unit, in which the PMTRP unit comprises:
- a first port, which is a target port, adapted to:
  - receive a memory transfer request associated with a first address space from a first interconnect; and
  - send a corresponding memory transfer response;
- a second port, which is a master port, adapted to:
  - send a memory transfer request associated with a second address space onto a second interconnect, in which the second interconnect is not the first interconnect; and
  - receive a corresponding memory transfer response;
- a first set of at least two programmable region descriptors in which:
  - for each programmable region descriptor, that programmable region descriptor:
    - is programmatically associated with a memory region of the first address space;
    - comprises a programmable access permission policy; and
    - comprises a programmable memory address translation policy;
- a third port, which is a target port, that is adapted to:
  - receive a memory transfer request associated with a third address space to access a portion of the first set of at least two programmable region descriptors; and
  - send a corresponding memory transfer response;
- means to process a well-formed memory transfer request received on the third port that is addressed to a memory location in the third address space that is associated with a portion of at least one programmable region descriptor of the first set of at least two programmable region descriptors;
- a fourth port, which is an output port;
- means to generate and send on the second port a memory transfer request in response to a memory transfer request received on the first port in accordance with the at least one policy associated with that received memory transfer request as stored in the first set of at least two programmable memory region descriptors;
- means to translate the address of a memory transfer request received on the first port when exactly one of the at least two programmable region descriptors programmatically associated with that address has its translation policy enabled; and
- means to generate a signal on the fourth port when there is more than one programmable region descriptor of the at least two programmable region descriptors programmatically associated with that address has its translation policy enabled.

In a further preferred embodiment of the present invention, at least one programmable region descriptor of the first set of at least two programmable region descriptors of the PMTRP unit has:
- at least one permission field associated with executable code memory transfer requests that are issued on behalf of software running on one or more processor cores; and
- at least one permission field associated with data memory transfer requests that are issued on behalf of software running on one or more processor cores.

In a further preferred embodiment of the present invention:
- the PTRMP unit comprises means to associate an address space identifier with a memory transfer request received on the first port of that PMTRP unit; and
- at least one of the programmable region descriptors of that PMTRP unit can be associated an address space identifier.

In a preferred embodiment of the present invention comprises, an apparatus comprises:
- a programmable memory transfer request processing (PMTRP) unit, comprising:
  - a first port, which is a target port, adapted to:

receive a memory transfer request associated with a first address space from a first interconnect; and
send a corresponding memory transfer response;
a second port, which is a master port, adapted to:
send a memory transfer request associated with a second address space onto a second interconnect, in which the second interconnect is not the first interconnect; and
receive a memory transfer response;
programmable configuration data, in which the programmable configuration data comprises:
at least one cached region descriptor that encodes at least one policy that is associated with a region of the first address space;
means to:
access at least N sets of at least two region descriptors by generating and sending at least one memory transfer request over the second port, in which at least 1 set of the at least two region descriptors is a set of cached region descriptors;
receive the corresponding response; and
cache that received region descriptor;
means to process a memory transfer request received on the first port in accordance with the policies encoded in a first set of the N sets of at least two region descriptors accessible over the second port at the time of processing; and
means to generate and send on the second port a memory transfer request in response to a memory transfer request received on the first port in accordance with the at least one policy associated with that received memory transfer request as stored in the first set of N sets of at least two region descriptors; and
in which the value of N is at least 1.

In a further preferred embodiment of the present invention, the value of N is at least 2 and the PMTRP unit is further adapted to:
partition the first address space of the first port into at least 2 contiguous regions; and
for each region of the at least 2 contiguous regions of the first address space:
programmatically associate that region with a different set of the N sets of at least two region descriptors accessible over the second port.

In a further preferred embodiment of the present invention, the PMTRP unit is further adapted with:
means to access at least one cache of region descriptors, in which each cache of the at least one cache of region descriptors contains at least two region descriptors, by generating and sending at least one memory transfer request over the second port and receiving the corresponding response(s);
means to process a memory transfer request received on the first port in accordance with the policies encoded in one of the at least one cache of region descriptors accessible over the second port at the time of processing; and
means to generate and send on the second port a memory transfer request in response to a memory transfer request received on the first port in accordance with the policies encoded in one of the at least one cache of region descriptors accessible over the second port at the time of processing.

In a further preferred embodiment of the present invention, the PMTRP unit is further adapted with:
a third port, which is a master port, adapted to:
send a memory transfer request associated with a third address space onto a third interconnect, in which the third interconnect is not the first interconnect and not the second interconnect; and
receive a memory transfer response;
means to process a memory transfer request received on the first port in accordance with the policies encoded in one set of the at least N sets of programmable region descriptors accessible over the third port at the time of processing; and
means to generate and send on the second port a memory transfer request in response to a memory transfer request received on the first port in accordance with the policies encoded in one set of the at least N sets of programmable region descriptors accessible over the third port at the time of processing.

In a preferred embodiment of the present invention, an apparatus comprising a programmable memory transfer request processing (PMTRP) unit, that PMTRP unit comprising:
a first port, which is a target port, adapted to:
receive a memory transfer request associated with a first address space, in which the first address space:
is subdivided into N partitions; and
the range of that address space is M kibibytes; and
send a corresponding memory transfer response;
a second port, which is a master port, adapted to:
send a memory transfer request associated with a second address space, in which the range of the second address space is O kibibytes; and
receive a corresponding memory transfer response;
programmable configuration data, in which the programmable configuration data comprises:
at least N region descriptors, in which:
each of the N region descriptors encodes at least one policy that is associated with a region of the first address space;
all of the at least N region descriptors are the same type of region descriptor and in which that type of region descriptor is selected from one of the 2 following types:
a page descriptor with support for at least 8 different page lengths;
a segment descriptor with support for at least 16 different allocated segment lengths;
at least N of the at least N region descriptors are associated with a different one of the N partitions of the first address space;
means to process a memory transfer request associated with the first address space received on the first port in accordance with the at least one policy associated with the first address space encoded in the programmable configuration data at the time of processing;
means to generate and send on the second port a memory transfer request associated with the second address space in response to a memory transfer request associated with the first address space received on the first port in accordance with the at least one policy associated with the first address space encoded in the programmable configuration data at the time of processing; and
in which:
the value of M is at least 1024;
the value of N is at least 2 and is less than 16384; and
the value of O is at least 1.

In a further preferred embodiment of the present invention, the PMTRP unit further comprises:

a third port, which is a target-port, adapted to:
  receive a memory transfer request associated with a third address space to access a portion of the programmable configuration data; and
  send a corresponding memory transfer response;
means to process a well-formed memory transfer request received on the third port that is addressed to a valid memory location that accesses a portion of at least one of the at least N region descriptors; and
means to respond to a well-formed read memory transfer request received on the third port that is addressed to a memory location that accesses a portion of at least one of the at least N region descriptors by sending a memory transfer response on the third port.

In a further preferred embodiment of the present invention, the PMTRP unit is adapted to employ one of the following lookup schemes:
  a type of direct-indexed lookup scheme to identify which of the at least N region descriptors is associated with a memory transfer request;
  a content associative memory lookup scheme to identify which of the at least N region descriptors is associated with a memory transfer request;
  a fully-associative lookup scheme to identify which of the at least N region descriptors is associated with a memory transfer request.

In a preferred embodiment of the present invention an apparatus comprises:
  a first programmable memory transfer request processing (PMTRP) unit, comprising:
    a first port, which is a target port, adapted to:
      receive a memory transfer request associated with a first address space; and
      send a corresponding memory transfer response;
    programmable configuration data, in which the programmable configuration data comprises:
      at least one region descriptor that encodes at least one policy that is associated with a region of the first address space, in which:
        for each of the at least one region descriptors, the type of that region descriptor is selected from one of the 5 following types:
          a page descriptor with a fixed length page;
          a page descriptor with a variable length page;
          a segment descriptor;
          a translation look aside buffer descriptor;
          a region descriptor that has been adapted with a programmable memory address translation policy;
    a second port, which is a master port, adapted to:
      send a memory transfer request associated with a second address space; and
      receive a corresponding memory transfer response;
    means to process a memory transfer request associated with the first address space received on the first port in accordance with the at least one policy associated with the first address space encoded in the programmable configuration data at the time of processing;
    means to generate and send on the second port a memory transfer request associated with the second address space in response to a memory transfer request associated with the first address space received on the first port in accordance with the at least one policy associated with the first address space encoded in the programmable configuration data at the time of processing;
    a third port, which is a target port, adapted to:
      receive a memory transfer request associated with a third address space for accessing a portion of the programmable configuration data; and
      send a corresponding memory transfer response;
    means to process a well-formed memory transfer request received on the third port that is addressed to a memory location in the third address space that is associated with a portion of at least one of the at least one region descriptor;
  a second programmable memory transfer request processing (PMTRP) unit, comprising:
    a first port, which is a target port, adapted to:
      receive a memory transfer request associated with a first address space; and
      send a corresponding memory transfer response;
    programmable configuration data, in which the programmable configuration data comprises:
      at least one descriptor that encodes at least one policy that is associated with a region of the first address space, in which that descriptor encodes at least one policy on how to transform at least one of the at least one policy encoded in a region descriptor received over one or more memory transfer requests on the first port;
    a second port, which is a master port, adapted to:
      send a memory transfer request associated with a second address space; and
      receive a corresponding memory transfer response;
    means to process a memory transfer request associated with the first address space received on the first port in accordance with the at least one policy associated with the first address space encoded in the programmable configuration data at the time of processing;
    means to generate and send on the second port a memory transfer request associated with the second address space in response to a memory transfer request associated with the first address space received on the first port in accordance with the at least one policy associated with the first address space encoded in the programmable configuration data at the time of processing;
    a third port, which is a target port, adapted to:
      receive a memory transfer request associated with a third address space for accessing a portion of the programmable configuration data; and
      send a corresponding memory transfer response;
    means to process a well-formed memory transfer request received on the third port that is addressed to a memory location in the third address space that is associated with a portion of at least one of the at least one descriptor;
  in which:
    the second port of the second PMTRP unit is connected to the third port of the first PMTRP unit.

Various embodiments of the invention may be embodied in many different forms, including computer program logic for use with a processor (e.g., a microprocessor, microcontroller, digital signal processor, or general purpose computer), programmable logic for use with a programmable logic device (e.g., a field programmable gate array (FPGA) or other PLD), discrete components, integrated circuitry (e.g., an application specific integrated circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as SPARK ADA, Fortran, C, C++, JAVA, Ruby, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the internet or world wide web).

Hardware logic (including programmable logic for use with a programmable logic device) implementing all or part of the functionality where described herein may be designed using traditional manual methods, or may be designed, captured, simulated, or documented electronically using various tools, such as computer aided design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the internet or world wide web).

BRIEF DESCRIPTION OF THE DRAWINGS

For a better understanding of the invention, and to show how it may be carried into effect, embodiments of it are shown, by way of non-limiting example only, in the accompanying drawings. In the drawings:

FIG. 19 is a block diagram illustrating various fields that may be present in a range descriptor (1910) that has been adapted with a programmable memory address translation policy according to a preferred embodiment of the present invention;

FIG. 20 is a block diagram (2000) illustrating the fields of a memory transfer request (2001) according to a preferred embodiment of the present invention;

FIG. 24 is a block diagram (600) illustrating an example mapping of an input address space (2401) to a translated address space (2402) using two MMU means (2101 and 2140 of FIG. 21) according to a preferred embodiment of the present invention.

REFERENCES

Figure 1:
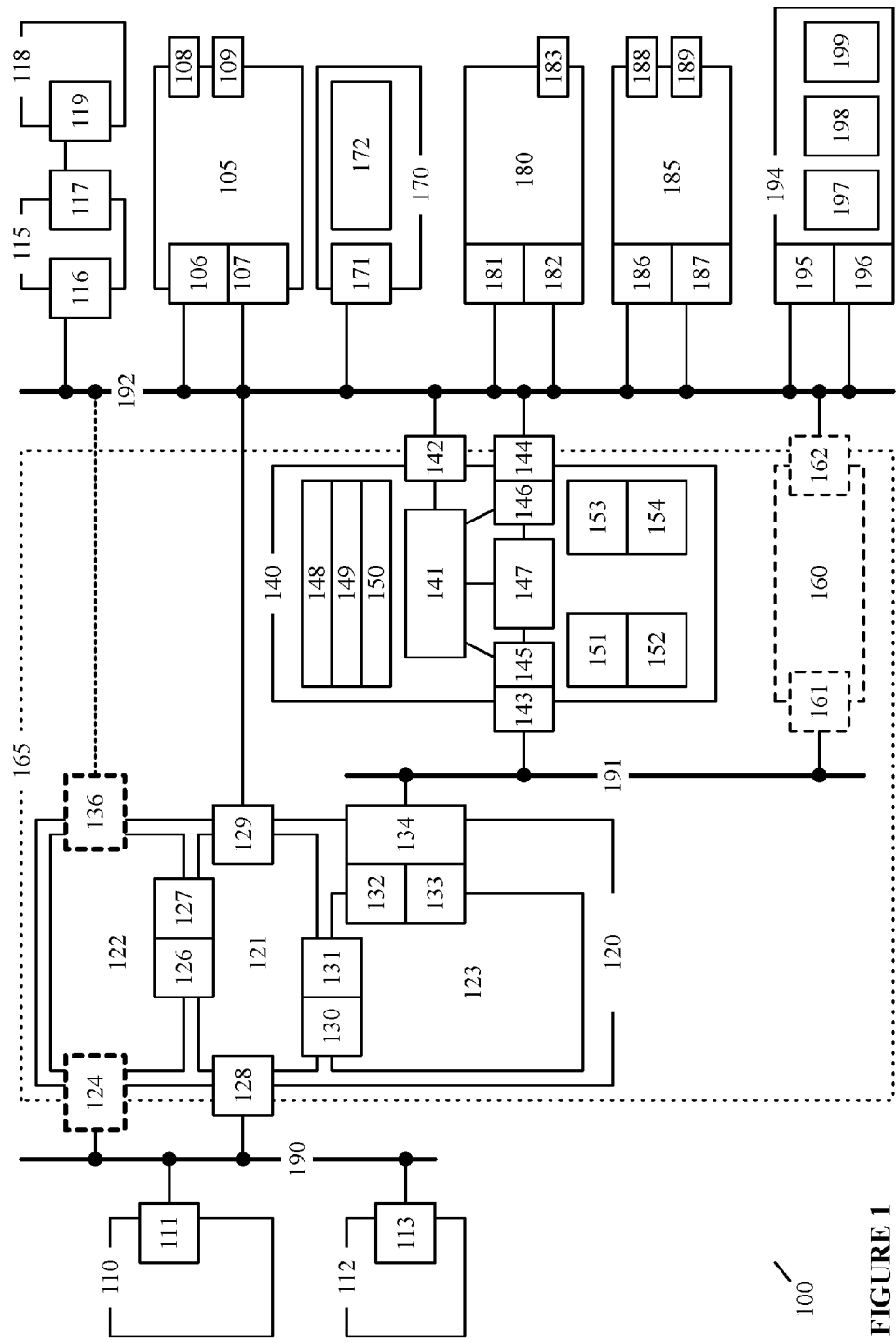
FIG. 1 is a block schematic diagram illustrating portions of an apparatus (100) for processing data for a preferred embodiment of the present invention.
Figure 2:
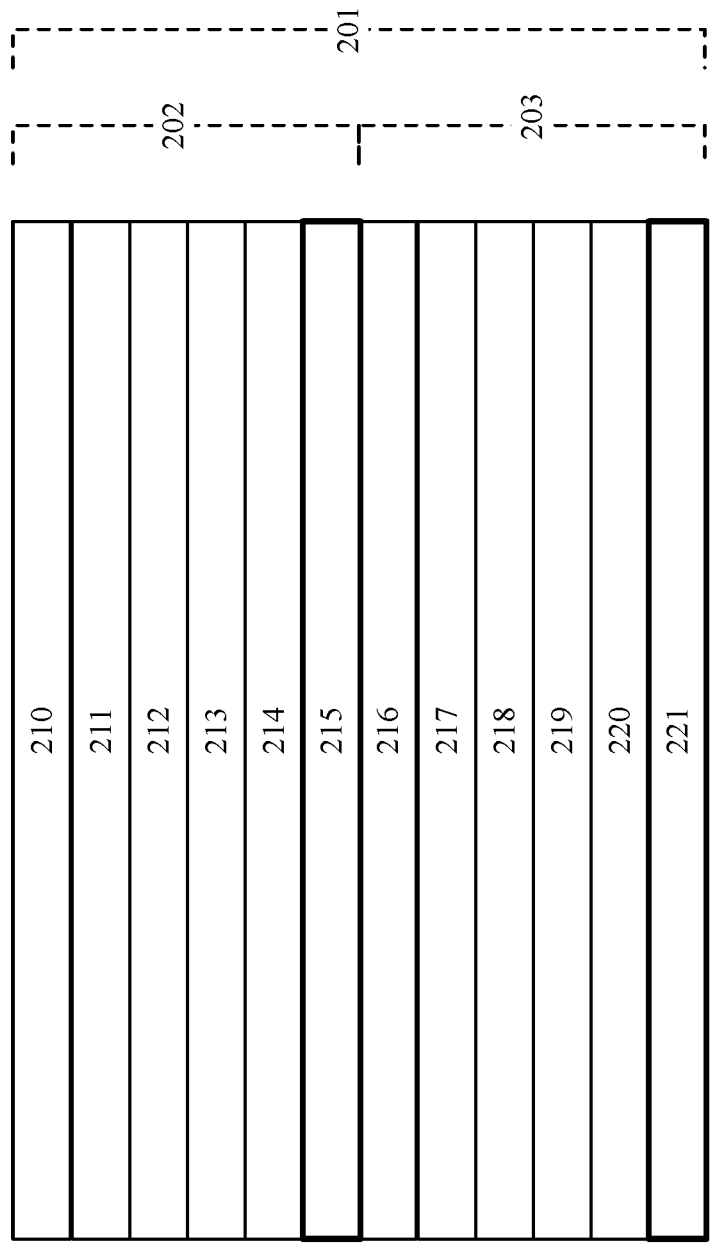
FIG. 2 is a block diagram (200) illustrating the partitioning of an address space (201) for accessing the programmable configuration data that is stored in the memory store (123) of the PMTRP unit (120) illustrated in FIG. 1 according to a preferred embodiment of the present invention.
Figure 3:
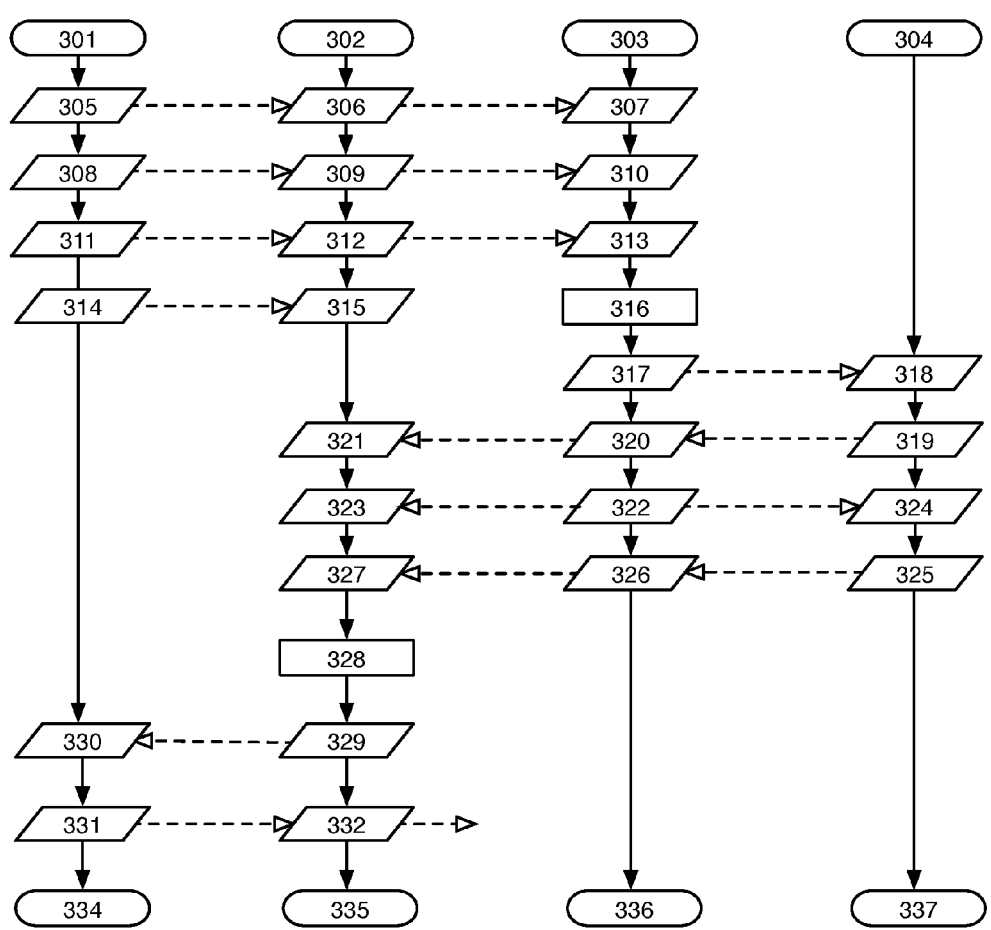
FIG. 3 is a flow chart (300) illustrating a memory-to-memory transfer operation performed by the PDMA unit (140 of FIG. 1) to program all of the of the programmable configuration data stored in the memory store (123 of FIG. 1) of the PMTRP unit (120 of FIG. 1) in one memory-to-memory transfer operation (148, 149, 150 of FIG. 1)
Figure 4:
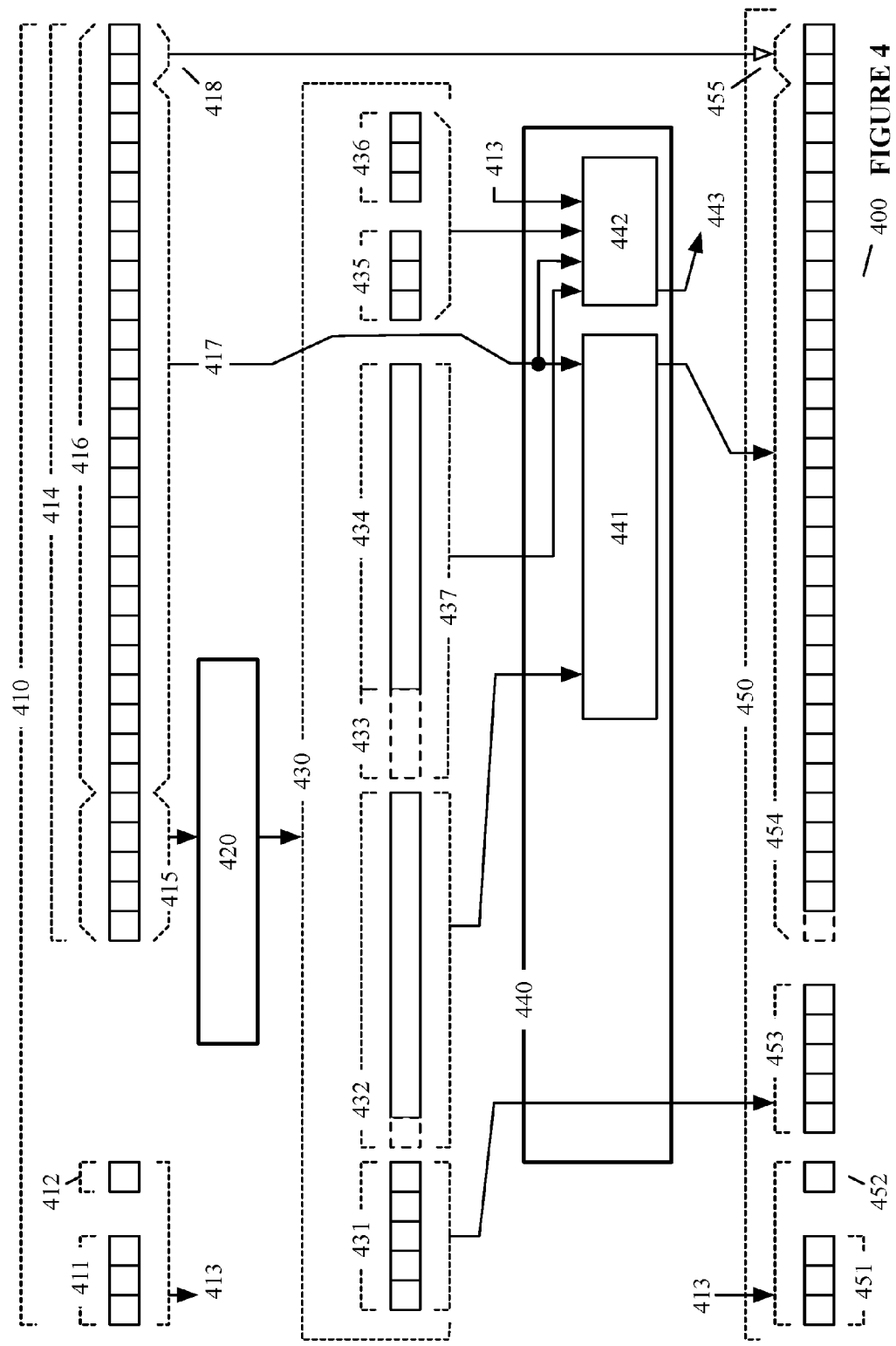
FIG. 4 is a hybrid block schematic diagram and data flow diagram partially illustrating a preferred embodiment of the present invention in which the PMTRP unit (120) of FIG. 1 is adapted to implement the functionality of a memory management unit (MMU)
Figure 5:
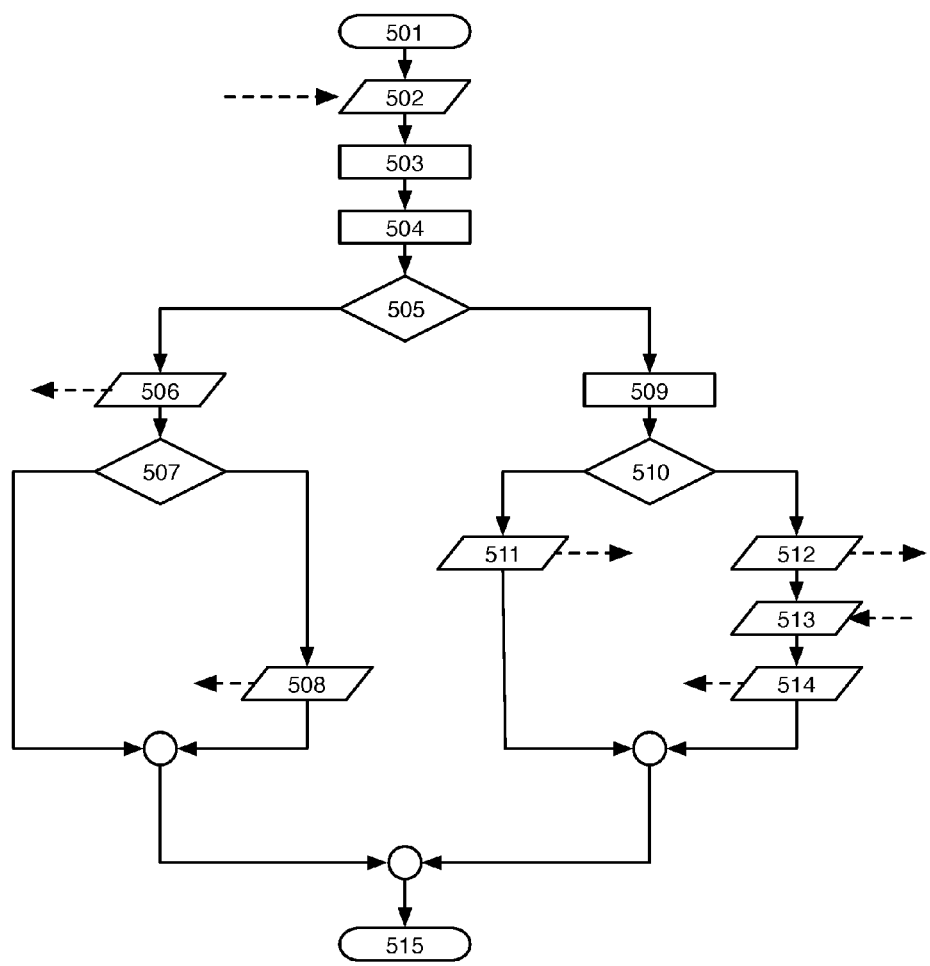
FIG. 5 is a flow chart (500) illustrating the steps of a memory address translation operation performed by the control unit (121) of the PMTRP unit (120) according to a preferred embodiment of the present invention.
Figure 6:
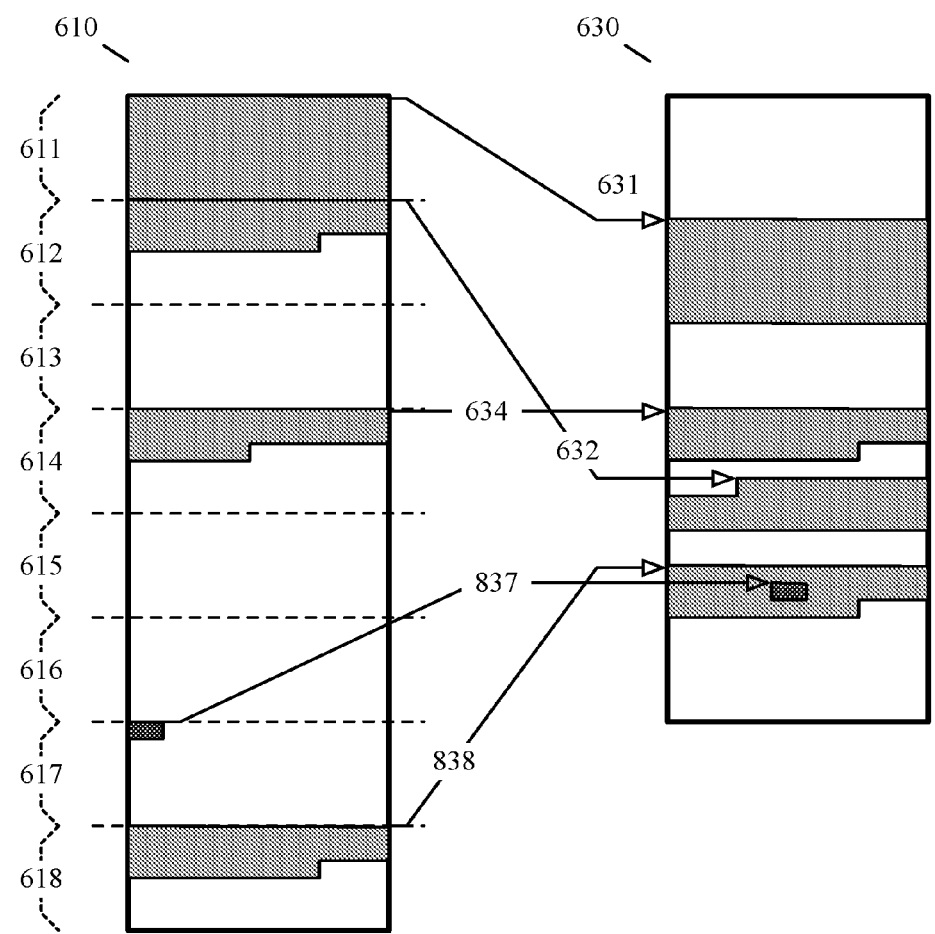
FIG. 6 is a block diagram (600) illustrating an example mapping of a segment based address translation scheme between an input address space (610) and a translated address space (630) according to a preferred embodiment of the present invention.
Figure 7:
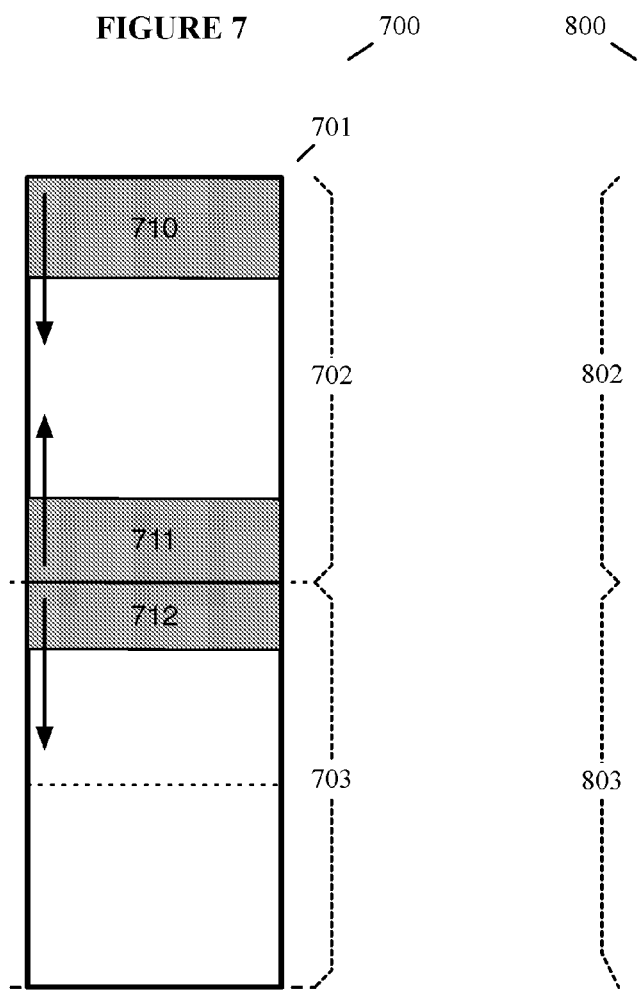
FIG. 7 is a block diagram (670) illustrating the organisation of the input address space (701) of the single-level direct mapped page based scheme for the DEC VAX-11/760 architecture as described in FIG. 6-1 of [3]
Figure 8:
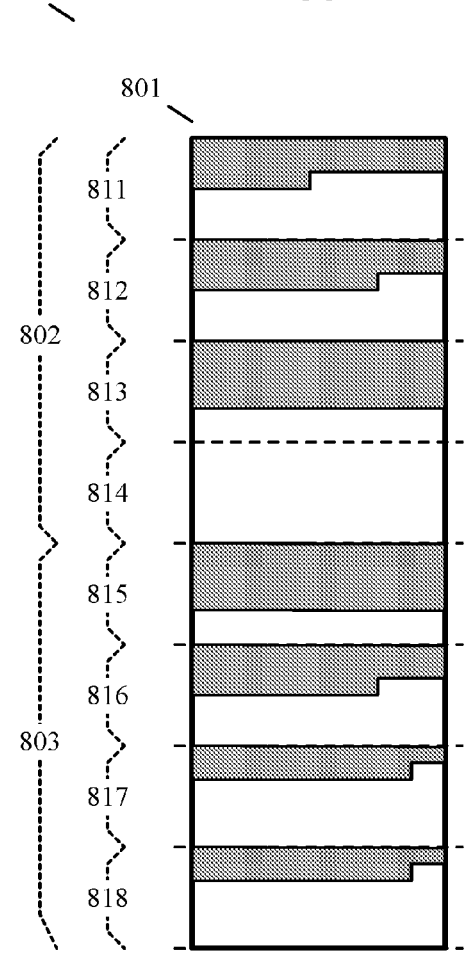
FIG. 8 is a block diagram (670) illustrating an innovative organisation of an input address space (701) for a single-level direct mapped segment based scheme for preferred embodiments of the present invention.
Figure 9:
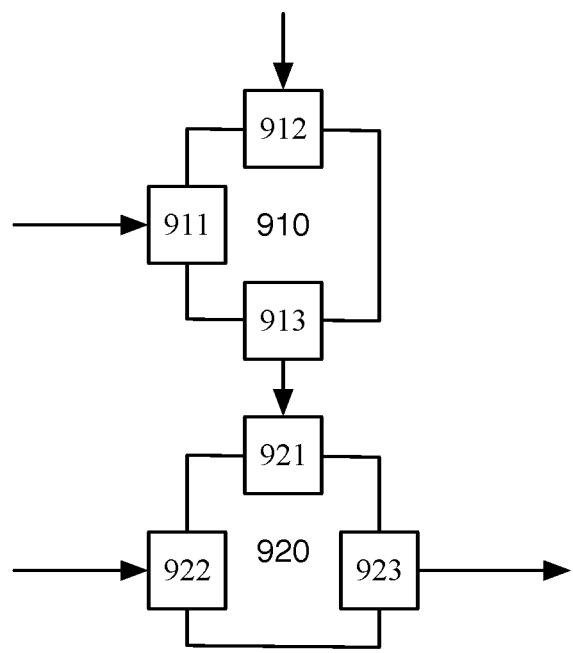
FIG. 9 is a block diagram (900) illustrating two-levels of memory management means according to a preferred embodiment of the present invention.
Figure 10:
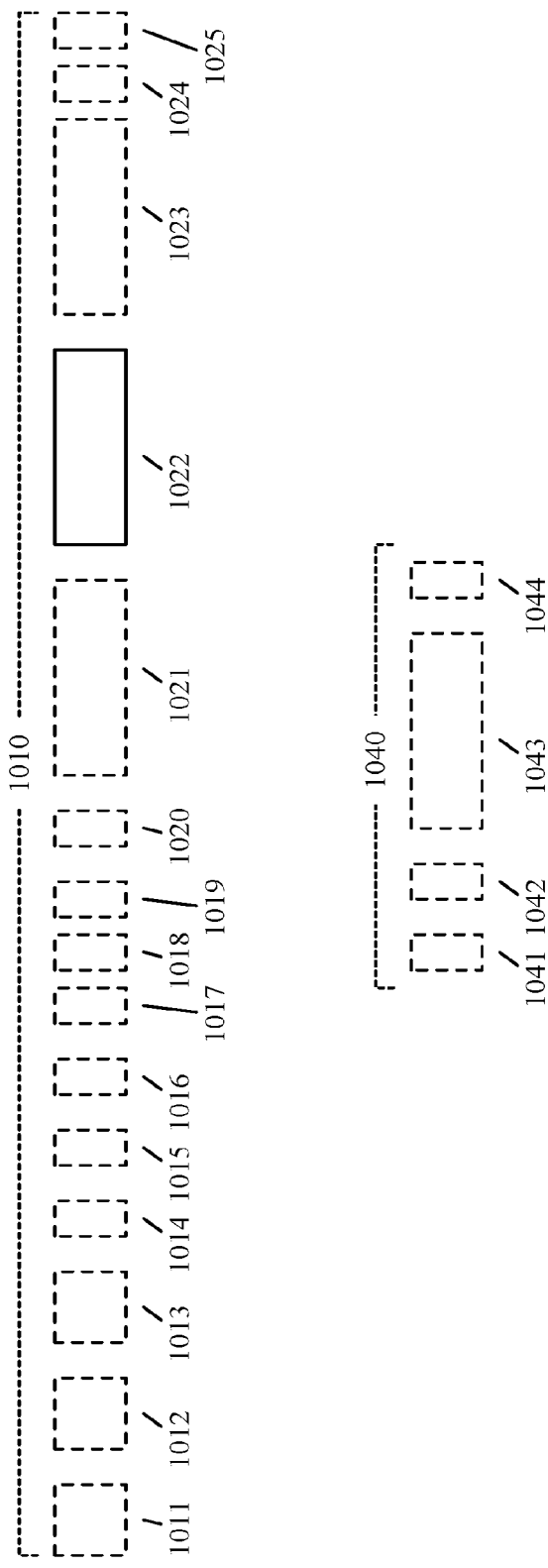
FIG. 10 is a block diagram (1000) illustrating various fields that may be present in a memory transfer request (1010) and a memory transfer response (1040) according to a preferred embodiment of the present invention.
Figure 11:
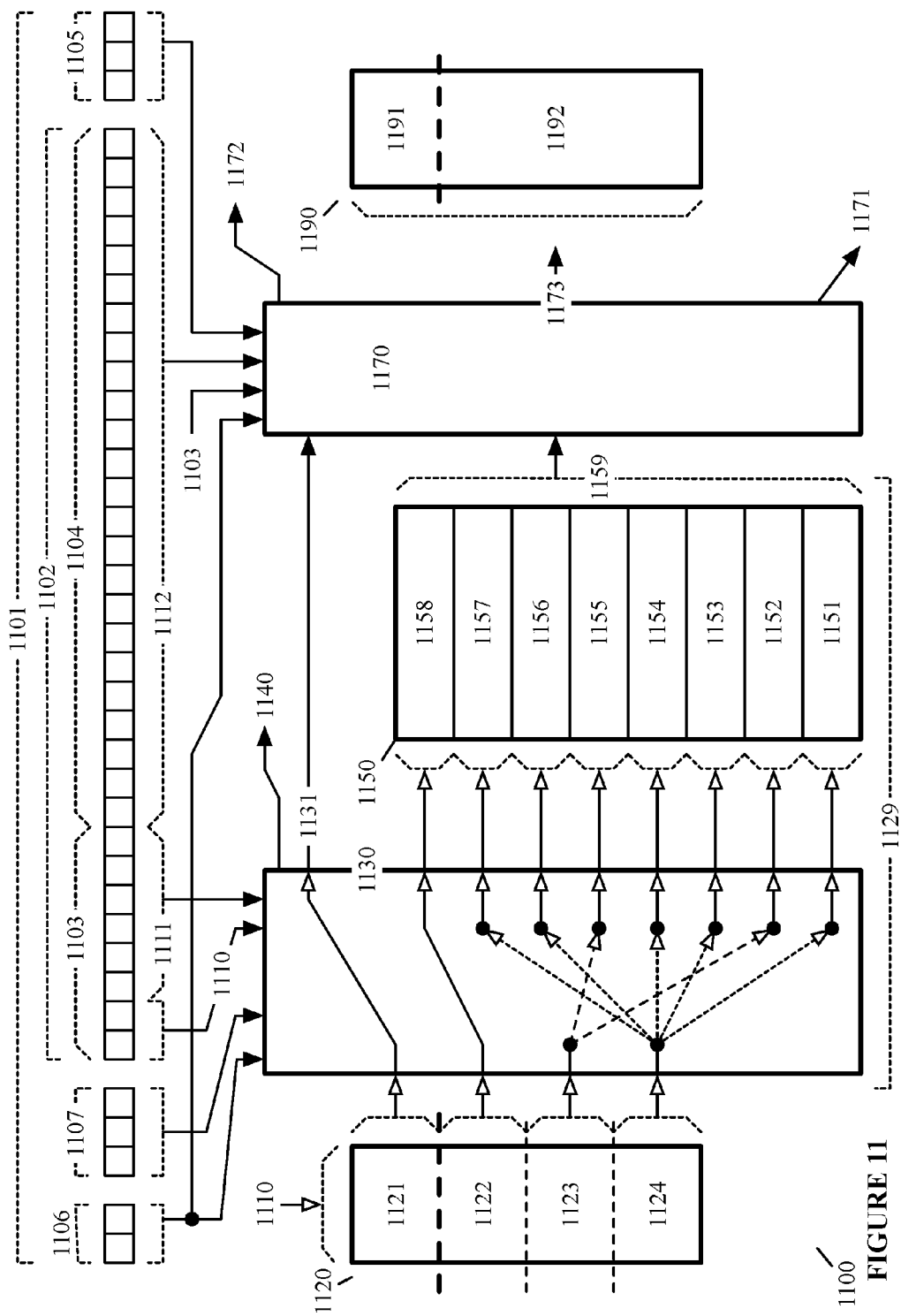
FIG. 11 is a hybrid block schematic diagram and data flow diagram partially illustrating a preferred embodiment (1100) of the present invention in which the PMTRP unit (120) of FIG. 1 is adapted to implement the functionality of a partitioned single-level direct indexed page based memory management unit (MMU)
Figure 12:
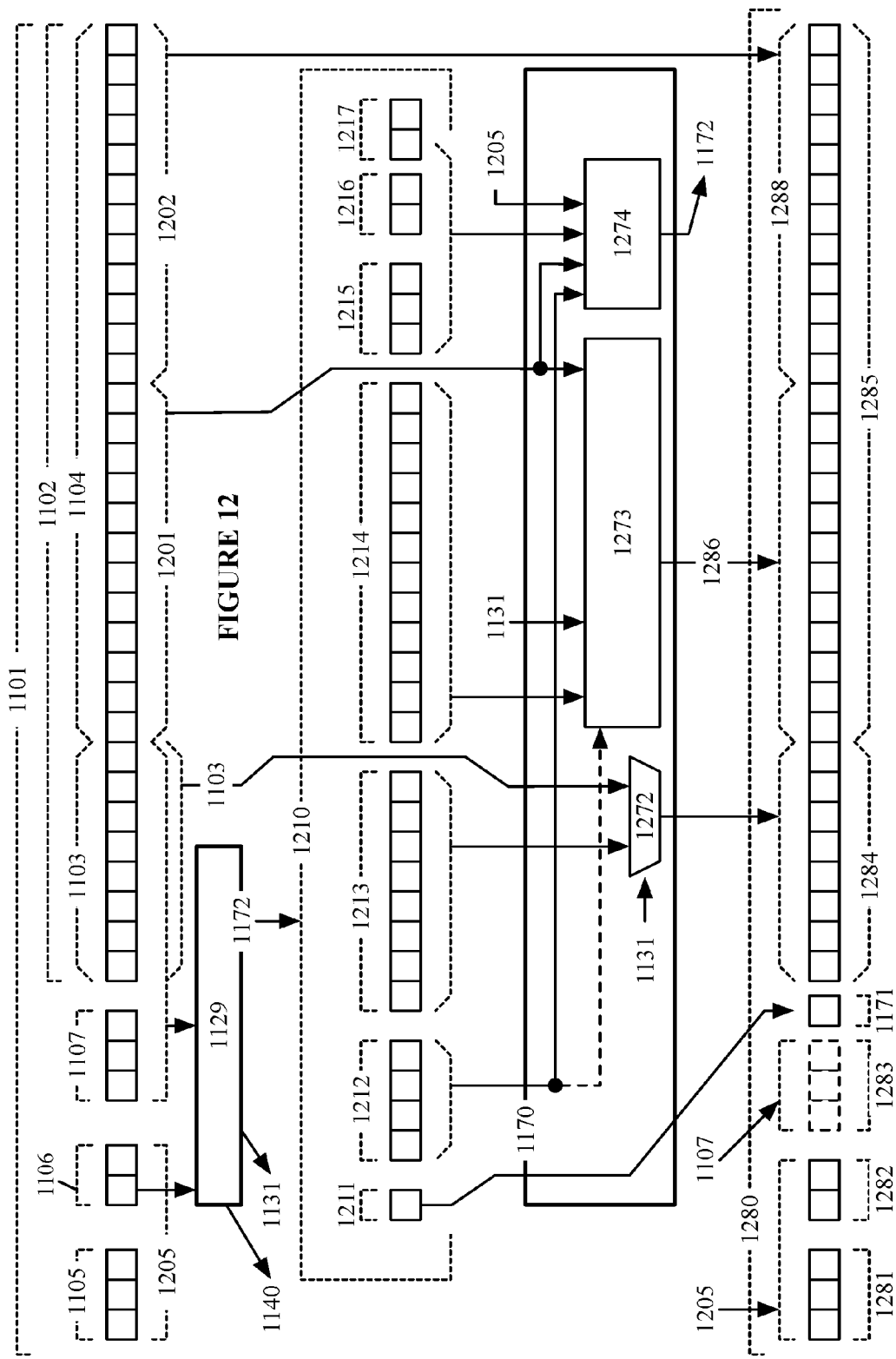
FIG. 12 is a hybrid block schematic diagram and data flow diagram partially illustrating a preferred embodiment of the present invention in which the PMTRP unit (120) of FIG. 1 is adapted to implement the functionality of a memory management unit (MMU)
Figure 13:
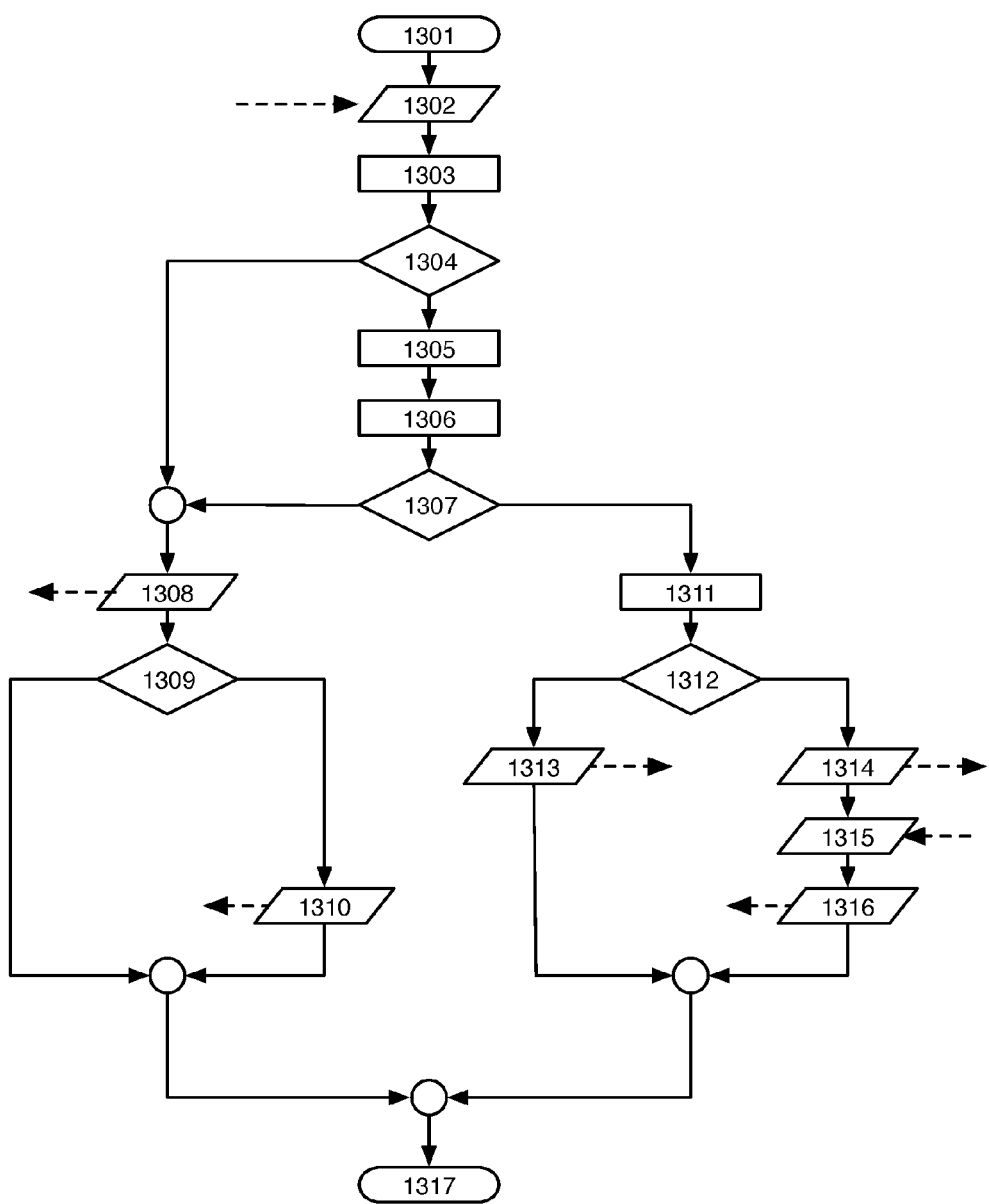
FIG. 13 is a flow chart (1300) illustrating a memory address translation operation performed by the control unit (121 of FIG. 1) of the PMTRP unit (120 of FIG. 1) according to preferred embodiments of the present invention as described in FIG. 11 and FIG. 12.
Figure 14:
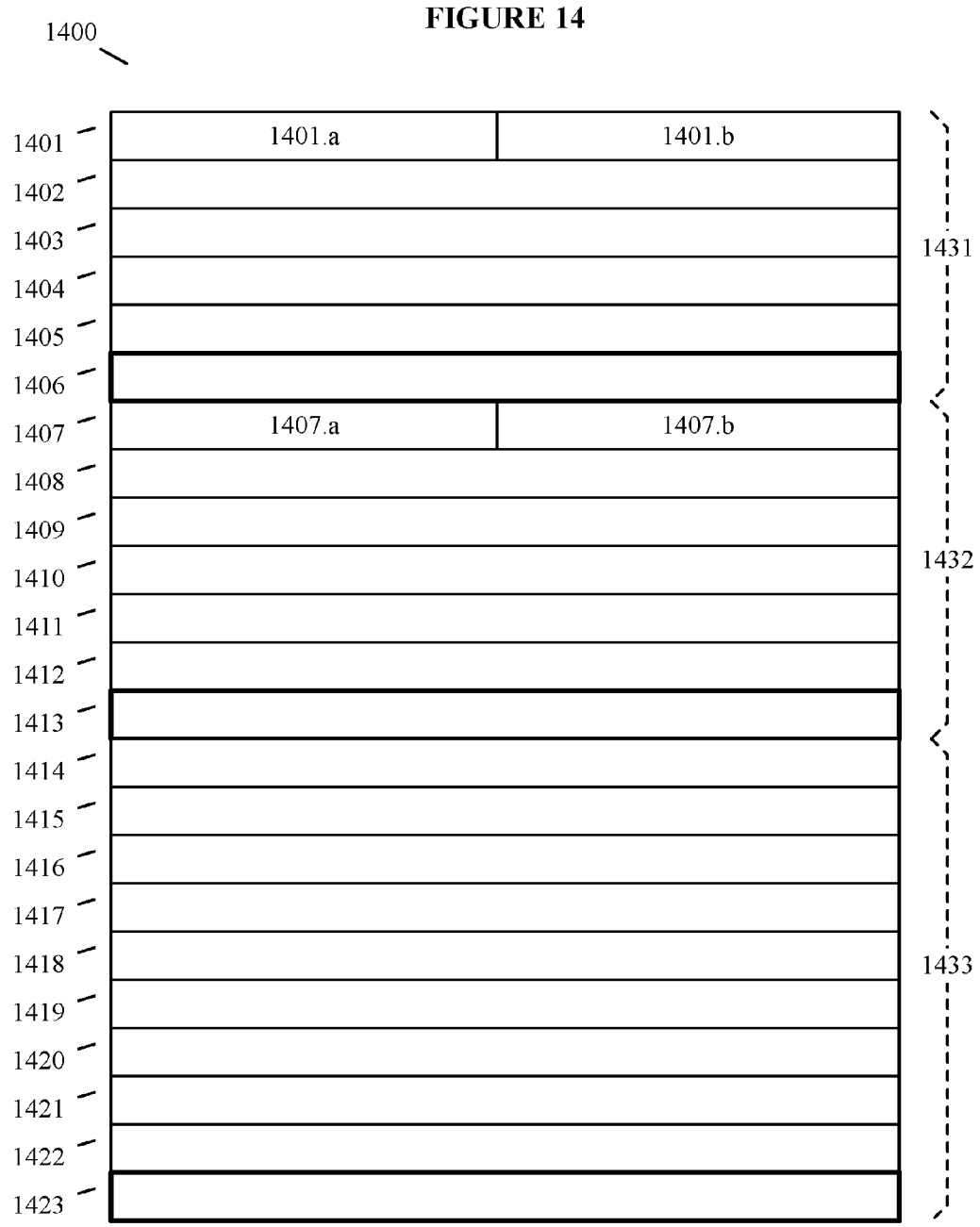
FIG. 14 is a block diagram illustrating the partitioning of an address space (1400) for accessing programmable configuration data stored in the memory store (123) of the PMTRP unit (120) according to a preferred embodiment of the present invention.
Figure 15:
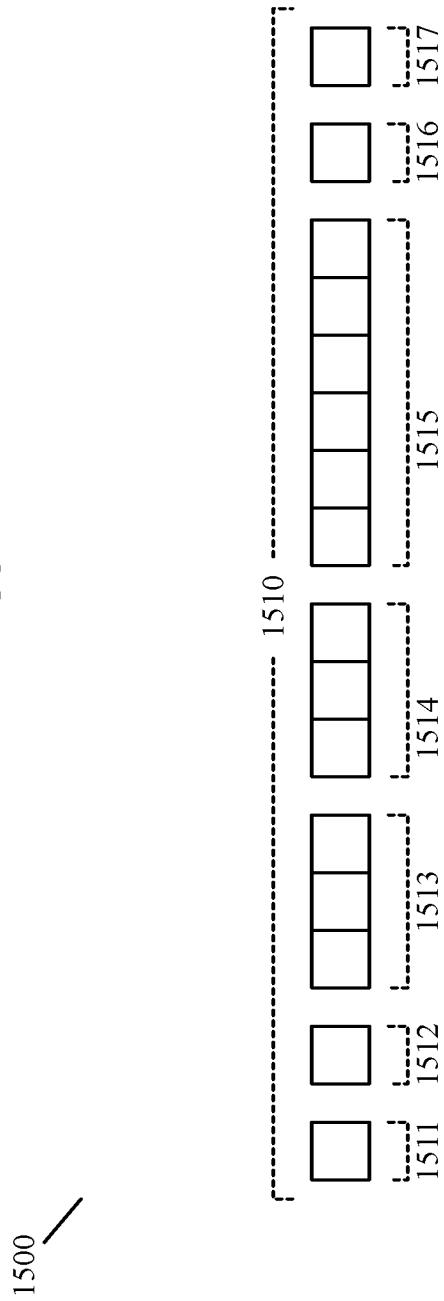
FIG. 15 is a block diagram illustrating a 16-bit wide configuration metadata field (1510) employed in FIG. 14 according to a preferred embodiment of the present invention.
Figure 16:
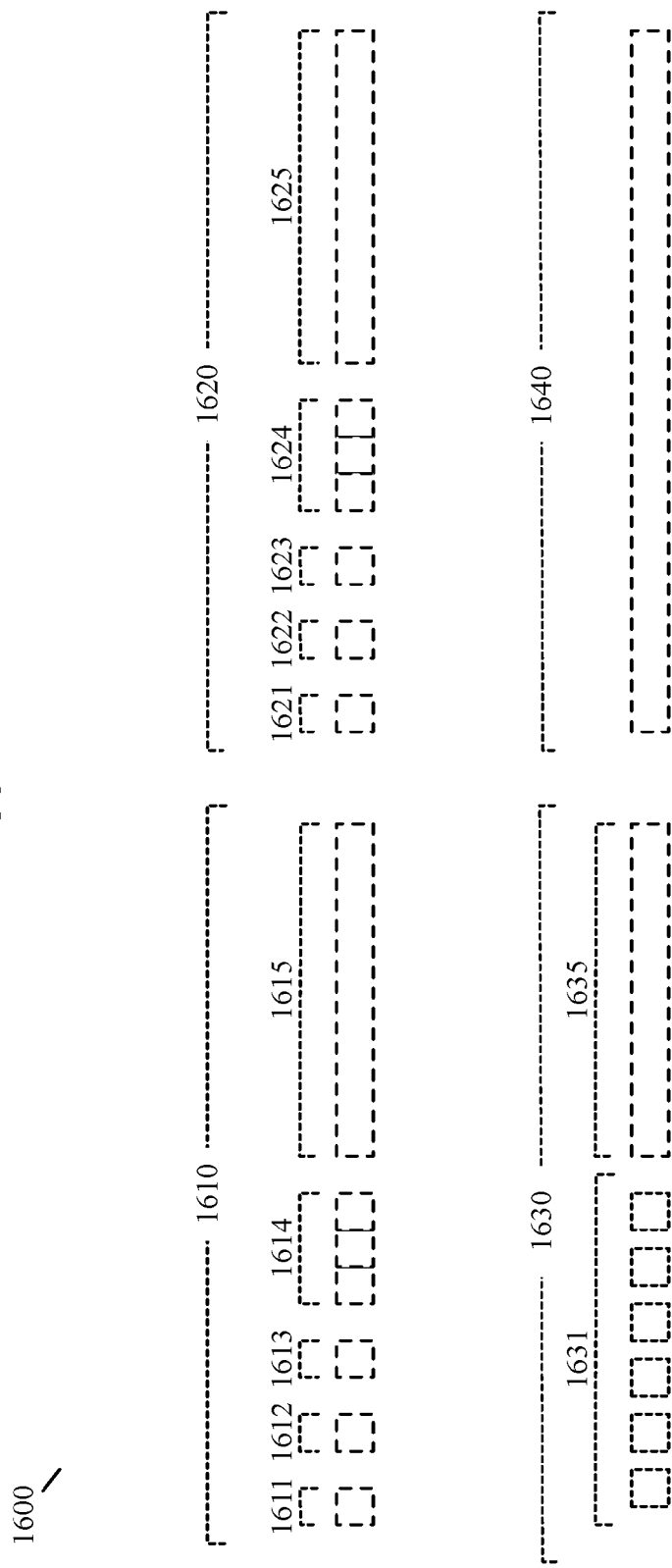
FIG. 16 is a block diagram illustrating a region descriptor (1600) employed in FIG. 14 according to a preferred embodiment of the present invention.
Figure 17:
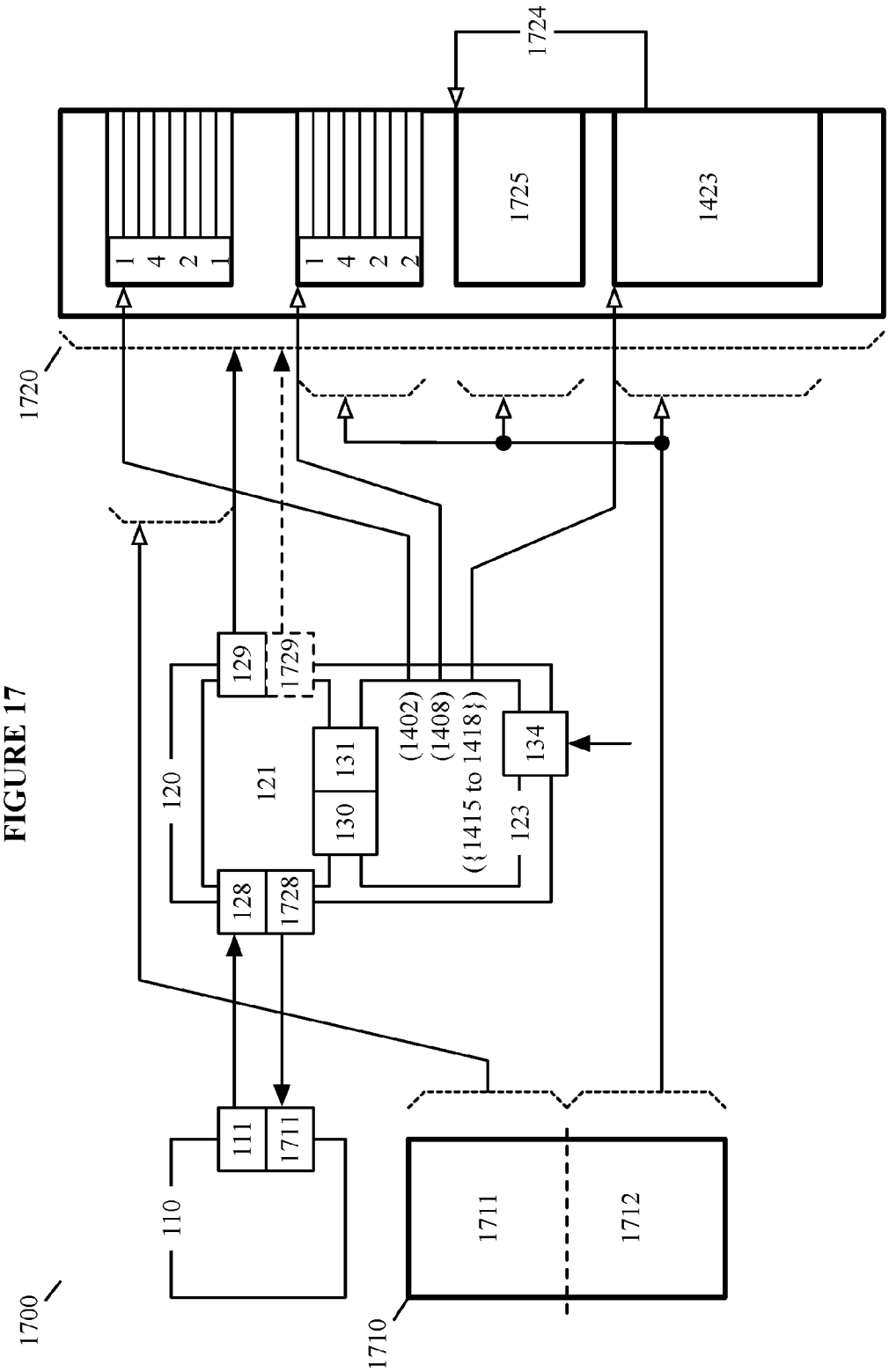
FIG. 17 is a hybrid block schematic diagram and data flow diagram partially illustrating an apparatus (1700) according to a preferred embodiment of the present invention as described with reference to FIGS. 1, 14, 15 and 16.
Figure 18:
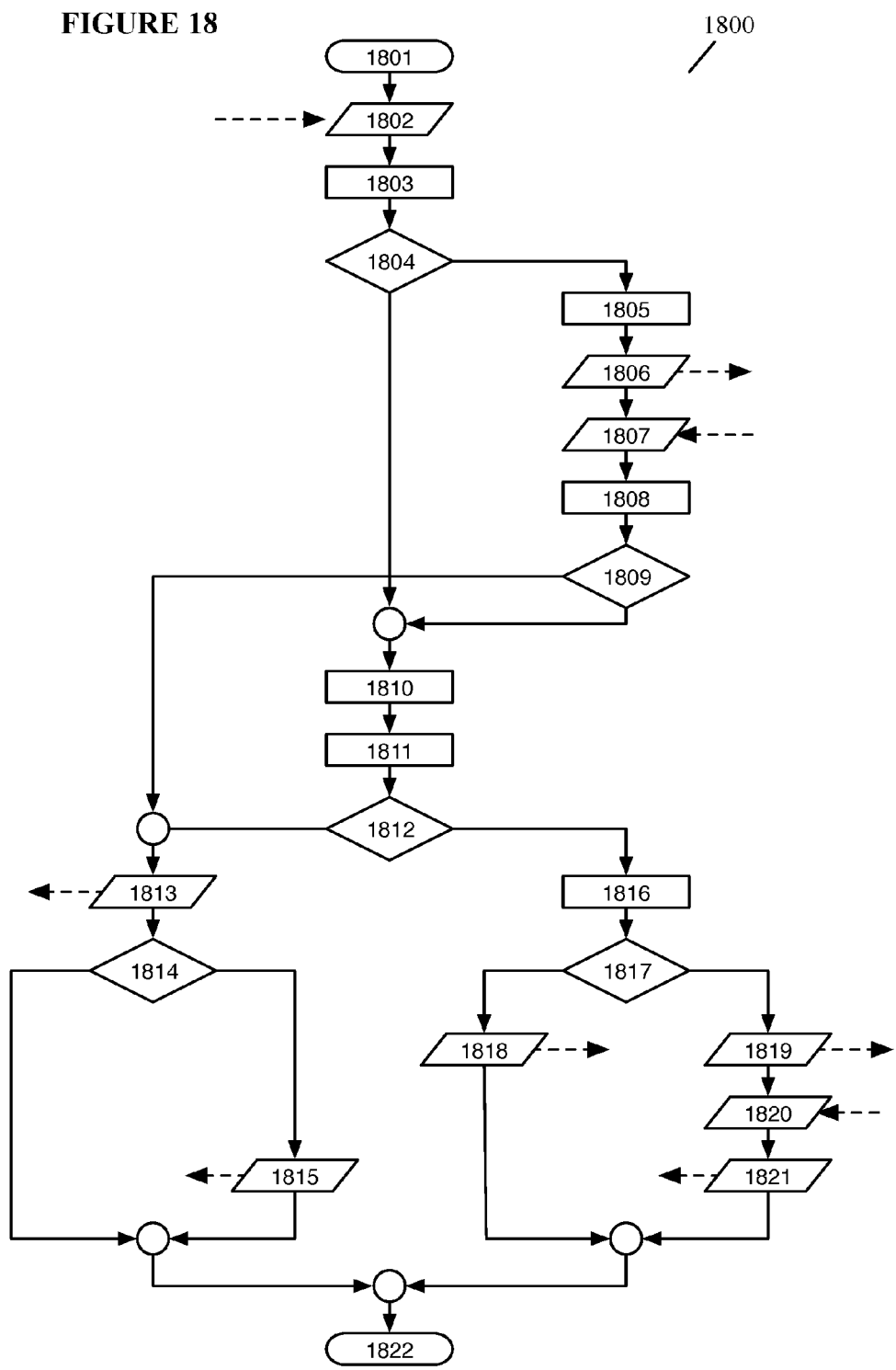
FIG. 18 is a flow chart (1800) illustrating a memory address translation operation performed by the control unit (121 of FIG. 17) of the PMTRP unit (121 of FIG. 17) according to FIGS. 14, 15, 16 and 17.
Figure 21:
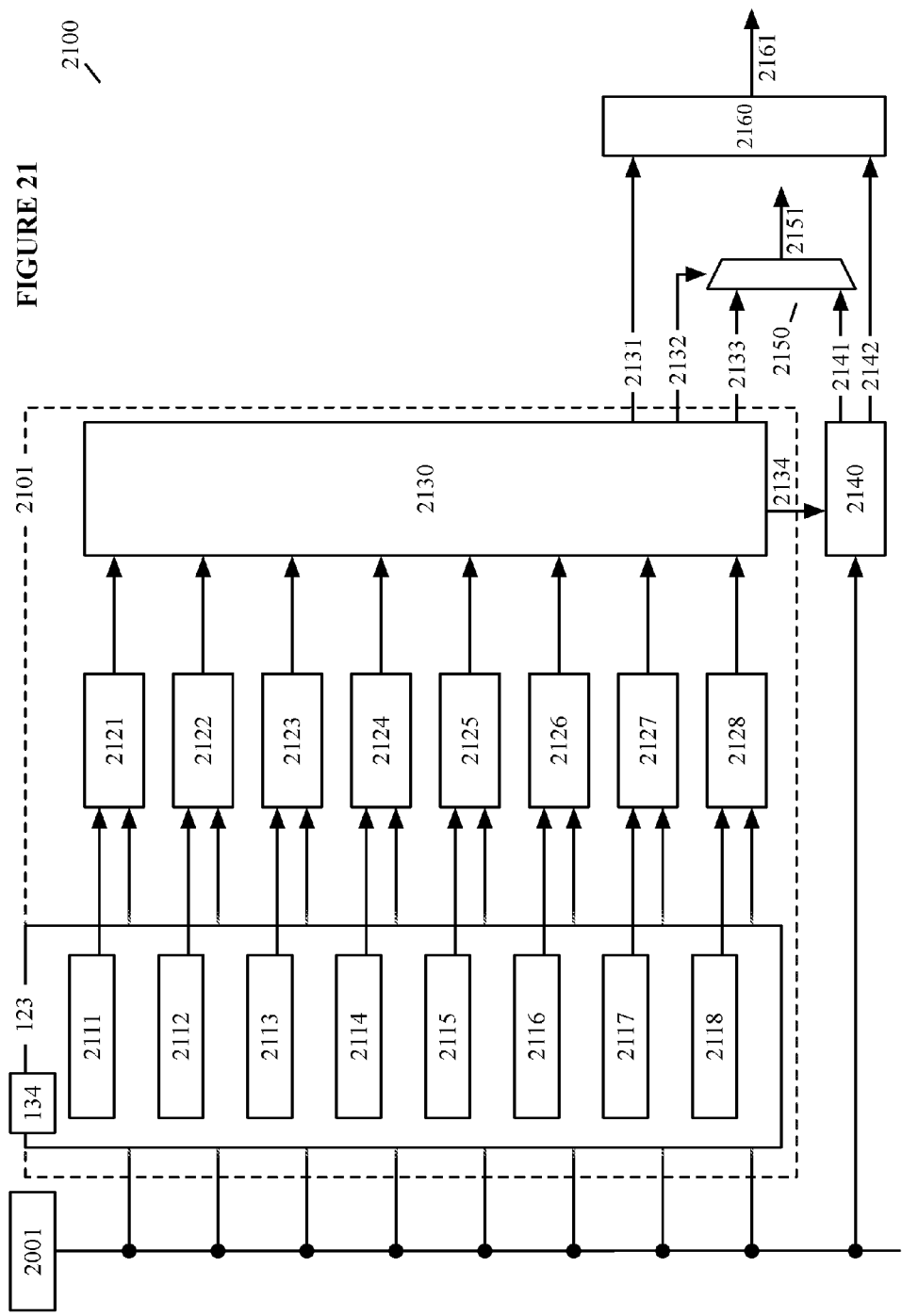
FIG. 21 is a hybrid block schematic diagram and data flow diagram partially illustrating a preferred embodiment (2100) of the present invention in which the PMTRP unit (120) of FIG. 1 is adapted to employ two memory management units (2101, 2140)
Figure 22:
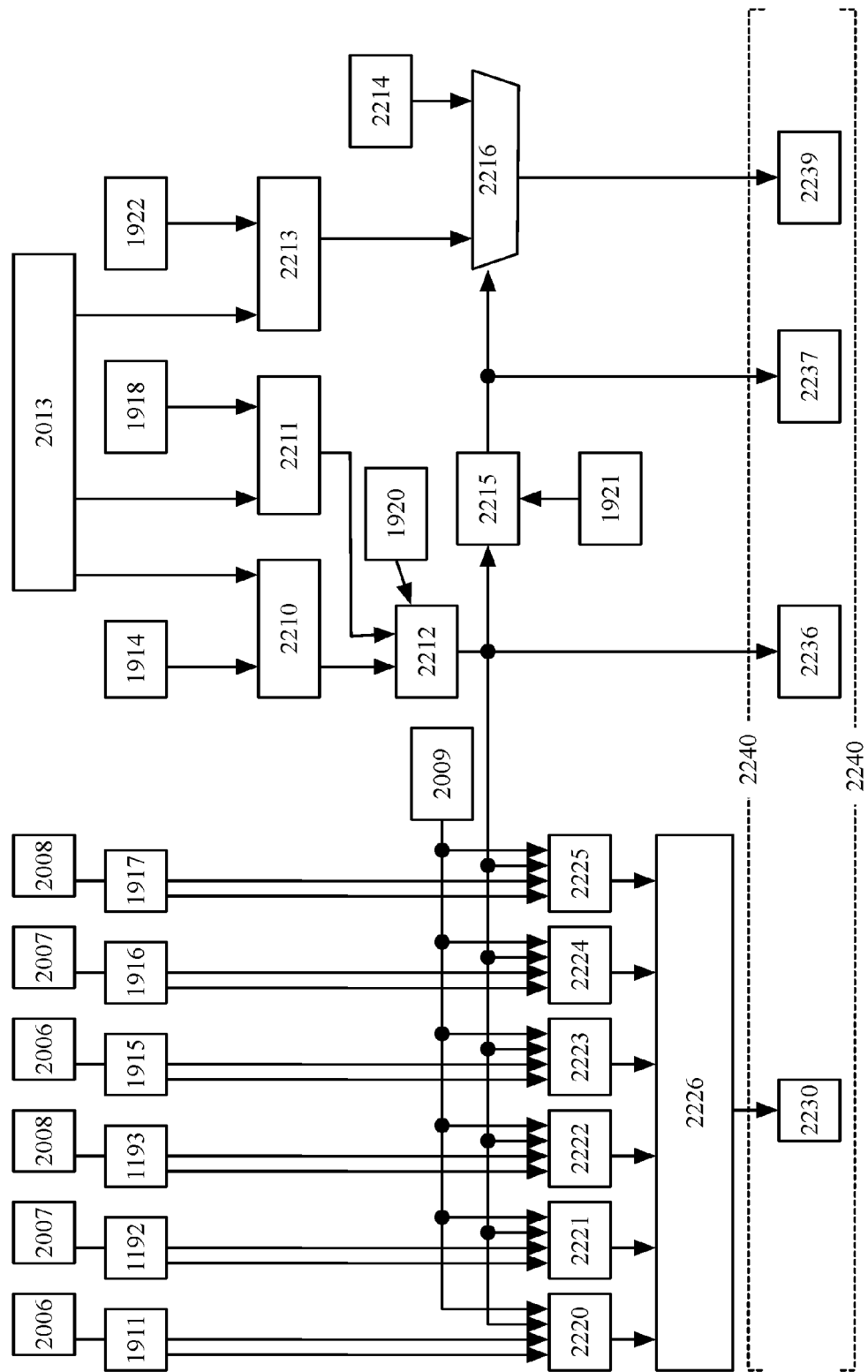
FIG. 22 is a hybrid block schematic diagram and data flow diagram partially illustrating a range descriptor comparator module (2200) according to a preferred embodiment of the present invention.
Figure 23:
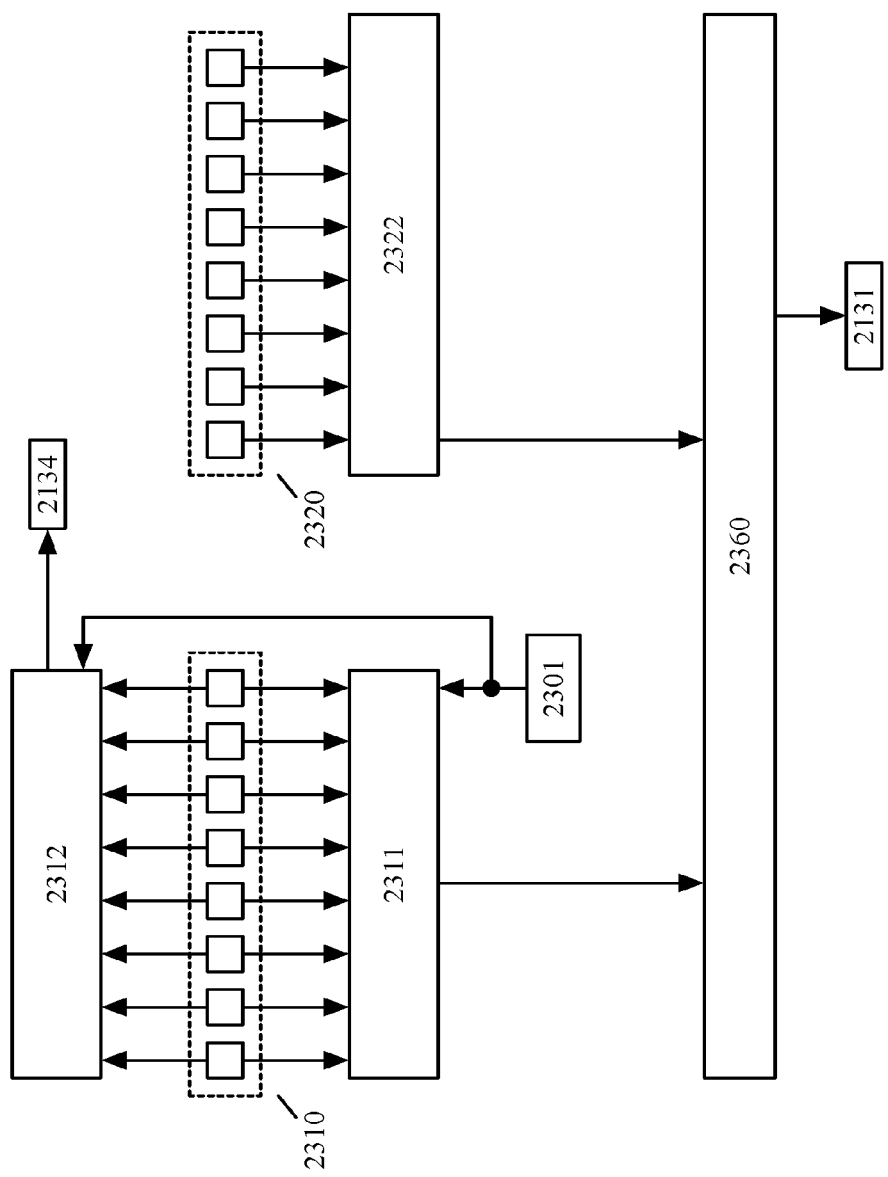
FIG. 23 is a hybrid block schematic diagram partially illustrating (2300) a comparator result aggregator module (2130 of FIG. 21) according to a preferred embodiment of the present invention.

[1] Henry M. Levy, Capability-Based Computer Systems, Digital Press, 1984.
[2] Harvey G. Cragon, Memory Systems and Pipelined Processors, 1996.
[3] Digital. Vax11/780 Hardware Handbook, 1979-80, 1979.

The invention claimed is:
1. An apparatus comprising:
 a programmable memory transfer request processing (PMTRP) unit, comprising:
  a first port, which is a target port, adapted to:
   receive a memory transfer request associated with a first address space; and
   send a corresponding memory transfer response;
  programmable configuration data, in which the programmable configuration data comprises:
   at least one region descriptor that encodes at least one policy that is associated with a region of the first address space, in which:
    for each of the at least one region descriptors, the type of that region descriptor is selected from one of the 7 following types:
     a page descriptor with a fixed length page;
     a page descriptor with a variable length page;
     a segment descriptor;
     a translation look aside buffer descriptor;
     a range descriptor;
     a range descriptor that has been adapted with a programmable memory address translation policy;
     a cache tag descriptor;
  a second port, which is a master port, adapted to:
   send a memory transfer request associated with a second address space; and
   receive a corresponding memory transfer response;
  means to process a memory transfer request associated with the first address space received on the first port in accordance with the at least one policy associated with the first address space that are encoded in the programmable configuration data at the time of processing;
  means to generate and send on the second port a memory transfer request associated with the second address space in response to a memory transfer request associated with the first address space received on the first port in accordance with the at least one policy associated with the first address space that are encoded in the programmable configuration data at the time of processing;
  a third port, which is a target port, adapted to:
   receive a memory transfer request associated with a third address space for accessing a portion of the programmable configuration data; and
   send a corresponding memory transfer response;
  means to process a well-formed memory transfer request received on the third port that is addressed to a memory location in the third address space that is associated with a portion of at least one of the at least one region descriptor;
 a programmable direct memory access (PDMA) unit comprising:
  a first port, which is a target port, adapted to:
   receive a memory transfer request to control the PDMA unit; and
   send a corresponding memory transfer response;
  a second port, which is a master port, adapted to:
   send a memory transfer request; and
   receive a corresponding memory transfer response;
  programmable configuration data, including:
   at least one memory-to-memory transfer control descriptor that can describe a memory-to-memory transfer operation; and
  means to process a memory-to-memory transfer operation using the second port and at least one memory-to-memory transfer control descriptor; and
 in which:
  the PDMA unit is adapted to send a memory transfer request from its second port to the third port of the PMTRP unit; and
  the PMTRP unit is adapted to receive and successfully process a well-formed memory transfer request issued over the second port of the PDMA unit that is addressed to a memory location in the third address space that is associated with a portion of at least one of the at least one region descriptor of the PMTRP unit.

2. An apparatus as claimed in claim 1 in which:
a portion of the programmable configuration data is associated with the user portion of the first address space; and
all of the programmable configuration data of the PMTRP unit associated with the user portion of the first address space that is accessible over the third port of the PMTRP unit can be programmed in one memory-to-memory transfer operation of the PDMA unit.

3. An apparatus as claimed in claim 2 in which the programmable configuration data of the PMTRP unit further comprises at least one cache line or at least one cache block.

4. An apparatus as claimed in claim 1 in which the programmable configuration data of the PMTRP unit further comprises at least one cache line or at least one cache block.

5. An apparatus that is adapted to map a memory transfer request associated with a first address space with one of at least N+1 logically independent memory transfer request processing regions, said first address space being partitioned into at least N contiguous partitions, said apparatus comprising:
a first port, which is a target port, adapted to:
receive a memory transfer request associated with a first address space, in which the memory transfer request is associated with:
a memory address in the first address space; and
an address space identifier; and
send a corresponding memory transfer response;
a second port adapted to send a value associated with one of the at least N+1 logically independent MTRP regions;
means to generate a value associated with one of the at least N+1 logically independent MTRP regions on the second port in response to a memory transfer request received on the first port;
means to indicate if a memory transfer request was not successfully mapped to one of the at least N+1 logically independent MTRP regions on the third port;
in which:
the value of N is at least 2;
at least 2 of the at least N+1 logically independent MTRP regions can be mapped to the same partition of at least N contiguous partitions of the first address space; and
if the memory address associated with a memory transfer request received on the first port is associated with one of the at least N contiguous partitions of the first address space that can have at least 2 of the at least N+1 logically independent MTRP regions mapped to it then the value of the address space identifier associated with that memory transfer request is used to distinguish which, if any, of those at least 2 of the at least N+1 logically independent PMTRP regions it maps to.

6. An apparatus as claimed in claim 5, in which each of the at least N+1 logically independent memory transfer request processing (MTRP) regions employs a programmable memory address translation scheme for translating memory transfer requests addressed to that region.

7. An apparatus as claimed in claim 6, in which at least one of the programmable memory translation address schemes employs a direct indexed one-level scheme.

8. An apparatus comprising:
A programmable memory transfer request processing (PMTRP) unit, comprising:
a first port, which is a target port, adapted to:
receive a memory transfer request associated with a first address space from a first interconnect; and
send a corresponding memory transfer response;
a second port, which is a master port, adapted to:
send a memory transfer request associated with a second address space onto a second interconnect, in which the second interconnect is not the first interconnect; and
receive a corresponding memory transfer response;
a first set of at least two programmable region descriptors in which:
for each programmable region descriptor, that programmable region descriptor:
is programmatically associated with a memory region of the first address space;
comprises a programmable access permission policy; and
comprises a programmable memory address translation policy;
a third port, which is a target port, that is adapted to:
receive a memory transfer request associated with a third address space to access a portion of the first set of at least two programmable region descriptors; and
send a corresponding memory transfer response;
means to process a well-formed memory transfer request received on the third port that is addressed to a memory location in the third address space that is associated with a portion of at least one programmable region descriptor of the first set of at least two programmable region descriptors;
a fourth port, which is an output port;
means to generate and send on the second port a memory transfer request in response to a memory transfer request received on the first port in accordance with the at least one policy associated with that received memory transfer request as stored in the first set of at least two programmable memory region descriptors;
means to translate the address of a memory transfer request received on the first port when exactly one of the at least two programmable region descriptors programmatically associated with that address has its translation policy enabled; and
means to generate a signal on the fourth port when there is more than one programmable region descriptor of the at least two programmable region descriptors programmatically associated with that address has its translation policy enabled.

9. An apparatus as claimed in claim 8 in which at least one programmable region descriptor of the first set of at least two programmable region descriptors of the PMTRP unit has:
at least one permission field associated with executable code memory transfer requests that are issued on behalf of software running on one or more processor cores; and
at least one permission field associated with data memory transfer requests that are issued on behalf of software running on one or more processor cores.

10. An apparatus comprising:
a programmable memory transfer request processing (PMTRP) unit, comprising:
a first port, which is a target port, adapted to:
receive a memory transfer request associated with a first address space from a first interconnect; and
send a corresponding memory transfer response;
a second port, which is a master port, adapted to:

send a memory transfer request associated with a second address space onto a second interconnect, in which the second interconnect is not the first interconnect; and receive a memory transfer response;

programmable configuration data, in which the programmable configuration data comprises:

at least one cached region descriptor that encodes at least one policy that is associated with a region of the first address space;

means to:

access at least N sets of at least two region descriptors by generating and sending at least one memory transfer request over the second port, in which at least 1 set of the at least two region descriptors is a set of cached region descriptors;

receive the corresponding response; and cache that received region descriptor;

means to process a memory transfer request received on the first port in accordance with the policies encoded in a first set of the N sets of at least two region descriptors accessible over the second port at the time of processing; and means to generate and send on the second port a memory transfer request in response to a memory transfer request received on the first port in accordance with the at least one policy associated with that received memory transfer request as stored in the first set of N sets of at least two region descriptors; and in which the value of N is at least 1.

11. An apparatus as claimed in claim 10 in which the value of N is at least 2 and the PMTRP unit is further adapted to:

partition the first address space of the first port into at least 2 contiguous regions; and for each region of the at least 2 contiguous regions of the first address space:

programmatically associate that region with a different set of the N sets of at least two region descriptors accessible over the second port.

12. An apparatus as claimed in claim 11 in which the PMTRP unit is further adapted with:

a third port, which is a master port, adapted to:

send a memory transfer request associated with a third address space onto a third interconnect, in which the third interconnect is not the first interconnect and not the second interconnect; and receive a memory transfer response;

means to process a memory transfer request received on the first port in accordance with the policies encoded in one set of the at least N sets of programmable region descriptors accessible over the third port at the time of processing; and means to generate and send on the second port a memory transfer request in response to a memory transfer request received on the first port in accordance with the policies encoded in one set of the at least N sets of programmable region descriptors accessible over the third port at the time of processing.

13. An apparatus as claimed in claim 11 in which:

for each set of the at least N sets of at least two region descriptors of the PMTRP unit:

all the region descriptors in that set are the same type; and the type of all the region descriptors is selected from one of the 6 following types:

a page descriptor with a fixed length page;

a page descriptor with a variable length page;

a segment descriptor;

a translation look aside buffer descriptor;

a range descriptor;

a range descriptor that has been adapted with a programmable memory address translation policy; and at least 2 sets of the at least N sets of at least two region descriptors of the PMTRP unit have different types of region descriptors.

14. An apparatus as claimed in claim 13 in which the PMTRP unit is further adapted with:

means to access at least one cache of region descriptors, in which each cache of the at least one cache of region descriptors contains at least two region descriptors, by generating and sending at least one memory transfer request over the second port and receiving the corresponding response(s);

means to process a memory transfer request received on the first port in accordance with the policies encoded in one of the at least one cache of region descriptors accessible over the second port at the time of processing; and means to generate and send on the second port a memory transfer request in response to a memory transfer request received on the first port in accordance with the policies encoded in one of the at least one cache of region descriptors accessible over the second port at the time of processing.

15. An apparatus as claimed in claim 14 in which the PMTRP unit is further adapted with:

means to access at least two caches of region descriptors, in which each cache of the at least two caches of region descriptors contains at least two region descriptors, by generating and sending at least one memory transfer request over the second port and receiving the corresponding response(s);

partition the first address space of the first port into at least 2 contiguous regions; and means to programmatically associate each of those at least 2 contiguous regions with one of the at least two caches of region descriptors accessible over the second port at the time of processing.

16. An apparatus as claimed in claim 14 in which the PMTRP unit is further adapted with:

a third port, which is a master port, adapted to:

send a memory transfer request associated with a third address space onto a third interconnect, in which the third interconnect is not the first interconnect and not the second interconnect; and receive a memory transfer;

means to process a memory transfer request received on the first port in accordance with the policies encoded in one set of the at least N sets of programmable region descriptors accessible over the third port at the time of processing; and means to generate and send on the second port a memory transfer request in response to a memory transfer request received on the first port in accordance with the policies encoded in one set of the at least N sets of programmable region descriptors accessible over the third port at the time of processing.

17. An apparatus as claimed in claim 10 in which:

for each set of the at least N sets of at least two region descriptors of the PMTRP unit:

all the region descriptors in that set are the same type; and the type of all the region descriptors is selected from one of the 6 following types:
- a page descriptor with a fixed length page;
- a page descriptor with a variable length page;
- a segment descriptor;
- a translation look aside buffer descriptor;
- a region descriptor;
- a region descriptor that has been adapted with a programmable memory address translation policy; and at least 2 sets of the at least N sets of at least two region descriptors of the PMTRP unit have different types of region descriptors.

18. An apparatus comprising:
a programmable memory transfer request processing (PMTRP) unit, comprising:
  a first port, which is a target port, adapted to:
    receive a memory transfer request associated with a first address space, in which the first address space:
      is subdivided into N partitions; and
      the range of that address space is M kibibytes; and
    send a corresponding memory transfer response;
  a second port, which is a master port, adapted to:
    send a memory transfer request associated with a second address space, in which the range of the second address space is O kibibytes; and
    receive a corresponding memory transfer response;
  programmable configuration data, in which the programmable configuration data comprises:
    at least N region descriptors, in which:
      each of the N region descriptors encodes at least one policy that is associated with a region of the first address space;
      all of the at least N region descriptors are the same type of region descriptor and in which that type of region descriptor is selected from one of the 2 following types:
        a page descriptor with support for at least 8 different page lengths;
        a segment descriptor with support for at least 16 different allocated segment lengths;
      at least N of the at least N region descriptors are associated with a different one of the N partitions of the first address space;
  means to process a memory transfer request associated with the first address space received on the first port in accordance with the at least one policy associated with the first address space that are encoded in the programmable configuration data at the time of processing;
  means to generate and send on the second port a memory transfer request associated with the second address space in response to a memory transfer request associated with the first address space received on the first port in accordance with the at least one policy associated with the first address space that are encoded in the programmable configuration data at the time of processing; and
in which:
  the value of M is at least 1024;
  the value of N is at least 2 and is less than 16384; and
  the value of O is at least 1.

19. An apparatus as claimed in claim 18, in which the PMTRP unit further comprises:
a third port, which is a target-port, adapted to:
  receive a memory transfer request associated with a third address space to access a portion of the programmable configuration data; and
  send a corresponding memory transfer response;
means to process a well-formed memory transfer request received on the third port that is addressed to a valid memory location that accesses a portion of at least one of the at least N region descriptors; and
means to respond to a well-formed read memory transfer request received on the third port that is addressed to a memory location that accesses a portion of at least one of the at least N region descriptors by sending a memory transfer response on the third port.

20. An apparatus comprising:
a first programmable memory transfer request processing (PMTRP) unit, comprising:
  a first port, which is a target port, adapted to:
    receive a memory transfer request associated with a first address space; and
    send a corresponding memory transfer response;
  programmable configuration data, in which the programmable configuration data comprises:
    at least one region descriptor that encodes at least one policy that is associated with a region of the first address space, in which:
      for each of the at least one region descriptors, the type of that region descriptor is selected from one of the 5 following types:
        a page descriptor with a fixed length page;
        a page descriptor with a variable length page;
        a segment descriptor;
        a translation look aside buffer descriptor;
        a region descriptor that has been adapted with a programmable memory address translation policy;
  a second port, which is a master port, adapted to:
    send a memory transfer request associated with a second address space; and
    receive a corresponding memory transfer response;
  means to process a memory transfer request associated with the first address space received on the first port in accordance with the at least one policy associated with the first address space encoded in the programmable configuration data at the time of processing;
  means to generate and send on the second port a memory transfer request associated with the second address space in response to a memory transfer request associated with the first address space received on the first port in accordance with the at least one policy associated with the first address space encoded in the programmable configuration data at the time of processing;
  a third port, which is a target port, adapted to:
    receive a memory transfer request associated with a third address space for accessing a portion of the programmable configuration data; and
    send a corresponding memory transfer response;
  means to process a well-formed memory transfer request received on the third port that is addressed to a memory location in the third address space that is associated with a portion of at least one of the at least one region descriptor;
a second programmable memory transfer request processing (PMTRP) unit, comprising:
  a first port, which is a target port, adapted to:
    receive a memory transfer request associated with a first address space; and send a corresponding memory transfer response;
programmable configuration data, in which the programmable configuration data comprises:
at least one descriptor that encodes at least one policy that is associated with a region of the first address space, in which that descriptor encodes at least one policy on how to transform at least one of the at least one policy encoded in a region descriptor received over one or more memory transfer requests on the first port;
a second port, which is a master port, adapted to:
send a memory transfer request associated with a second address space; and
receive a corresponding memory transfer response;
means to process a memory transfer request associated with the first address space received on the first port in accordance with the at least one policy associated with the first address space encoded in the programmable configuration data at the time of processing;
means to generate and send on the second port a memory transfer request associated with the second address space in response to a memory transfer request associated with the first address space received on the first port in accordance with the at least one policy associated with the first address space encoded in the programmable configuration data at the time of processing;
a third port, which is a target port, adapted to:
receive a memory transfer request associated with a third address space for accessing a portion of the programmable configuration data; and
send a corresponding memory transfer response;
means to process a well-formed memory transfer request received on the third port that is addressed to a memory location in the third address space that is associated with a portion of at least one of the at least one descriptor;
in which:
the second port of the second PMTRP unit is connected to the third port of the first PMTRP unit.

* * * * *